US012762611B2

(12) United States Patent
Singh

(10) Patent No.: US 12,762,611 B2
(45) Date of Patent: Oct. 13, 2026

(54) SYSTEM AND METHOD FOR CREATING VIRTUAL REALITY STORES OPTIMIZED FOR PRODUCT USES

(71) Applicant: Adeia Guides Inc., San Jose, CA (US)

(72) Inventor: Mona Singh, Cary, NC (US)

(73) Assignee: Adeia Guides Inc., San Jose, CA (US)

( * ) Notice: Subject to any disclaimer, the term of this patent is extended or adjusted under 35 U.S.C. 154(b) by 206 days.

(21) Appl. No.: 18/239,205

(22) Filed: Aug. 29, 2023

(65) Prior Publication Data

US 2025/0078146 A1 Mar. 6, 2025

(51) Int. Cl.

*G06Q 30/0601* (2023.01)
*G06F 3/04815* (2022.01)
*G06F 3/04845* (2022.01)
*G06T 19/00* (2011.01)

(52) U.S. Cl.

CPC ..... *G06Q 30/0643* (2013.01); *G06F 3/04815* (2013.01); *G06F 3/04845* (2013.01); *G06Q 30/0631* (2013.01); *G06T 19/006* (2013.01)

(58) Field of Classification Search

None

See application file for complete search history.

(56) References Cited

U.S. PATENT DOCUMENTS 7,249,063 B2 * 7/2007 McMullen ............ G06Q 30/02 705/27.1
10,614,616 B1 4/2020 Tedesco et al.
2008/0249865 A1 * 10/2008 Angell ............... G06Q 30/0277 705/14.51
2010/0241525 A1 * 9/2010 Aguera y Arcas .......................... G06Q 30/0601 705/26.1
2015/0058157 A1 * 2/2015 Tamir ..................... G06Q 50/01 705/26.7
2015/0324725 A1 * 11/2015 Roesbery ........... G06Q 30/0639 705/7.39
2018/0040044 A1 * 2/2018 Mattingly .......... G06Q 30/0617
2019/0066198 A1 * 2/2019 Keeler ............... G06Q 30/0643
2019/0236686 A1 8/2019 Thompson et al.

(Continued)

OTHER PUBLICATIONS

Optimizing Product Placement for Virtual Stores (Year: 2023).*

(Continued)

*Primary Examiner* — Victoria E. Frunzi
(74) *Attorney, Agent, or Firm* — HG LAW LLP

(57) ABSTRACT

Systems and methods for creating an optimized virtual reality store based on a user's product selections are disclosed. A user selects a product of interest from a virtual store. Based on metadata of the product of interest, a product use for the product of interest is identified. Associated products which supplement the product of interest in accomplishing the product use are identified. A level of importance for each associated product is determined based on the product of interest, product use, user data, and the difficulty in finding it in the virtual store. A set of associated products is recommended to the user based on their levels of importance. An optimized layout is generated based on the recommended products. Sections of the optimized layout are assigned a level of importance. The recommended products are displayed in the sections based on a corresponding level of importance of the recommended product.

20 Claims, 9 Drawing Sheets

(56) References Cited

U.S. PATENT DOCUMENTS

| | | | | |
|---|---|---|---|---|
| 2019/0251622 | A1 | 8/2019 | Wiedmeyer et al. | |
| 2021/0233149 | A1 * | 7/2021 | Korpeoglu | G06F 16/90328 |
| 2021/0233151 | A1 * | 7/2021 | Rahman | G06Q 30/0629 |
| 2023/0133891 | A1 * | 5/2023 | Lu | G06Q 30/0641 705/26.7 |
| 2023/0186375 | A1 | 6/2023 | Sakuma et al. | |
| 2023/0260219 | A1 * | 8/2023 | Doken | H04N 21/23418 345/633 |

OTHER PUBLICATIONS

"TMall plans to launch the Taobao Yuan Universe," Youtube [retrieved from URL: https://www.youtube.com/watch?v=5dDT_cxJ6Pw] 1 page (2022).
"Virtual Store Shopping Demonstration", Youtube [retrieved from URL: https://www.youtube.com/watch?v=zILFOhw6Hig] 1 page (2021).
"Walmart gets into metaverse," Youtube [retrieved from URL: https://www.youtube.com/watch?v=NDez9prnQqc] 1 page (2022).
"Walmart Virtual Store Demo," [retrieved from URL: https://mutualmobile.com/work/walmart on Nov. 6, 2023) 6 pages.
Wobbeking, J., ""TheMall" to become the largest shopping mall in the Metaverse," [retrieved from URL: https:// mixed-news.com/en/themall-to-become-the-largest-shopping-mall-in-the-metaverse/] 6 pages (2022).

* cited by examiner

500

700

| Item | Status | D-Score | F-Score | R-Score | Composite |
|---|---|---|---|---|---|
| Faucet 160 | Required | 5.40 | 0.80 | 1.25 | 6.75 |
| Tape 170 | Optional | 4.20 | 0.22 | 4.54 | 19.06 |
| Pipe Wrench 162 | Required | 8.20 | 0.08 | 12.5 | 102.50 |
| Supply Line 164 | Required | 2.20 | 0.10 | 10 | 22 |
| Putty 166 | Optional | 10.00 | 0.15 | 6.66 | 66.6 |
| Drains 168 | Optional | 10.00 | 0.10 | 10 | 100 |

SYSTEM AND METHOD FOR CREATING VIRTUAL REALITY STORES OPTIMIZED FOR PRODUCT USES

FIELD OF INVENTION

Embodiments of the present disclosure relate to creating an optimized virtual reality store based on a user's product selections.

SUMMARY

Shopping in a brick-and-mortar establishment can be a time-consuming and frustrating process. Physical stores require shoppers to physically travel to the location of the store, which can be time-consuming, especially if the store is far away. It involves dealing with traffic, finding parking, and sometimes even waiting in long lines at the checkout counter. Further, physical stores are limited by their physical space, which means they can only stock a certain number of products. This can lead to frustration if the item a shopper is looking for is out of stock or not available in the store. Additionally, in a physical store, finding the specific item a shopper is looking for can be time-consuming. The shopper may need to navigate through aisles and shelves, ask store employees for assistance, or wait for them to retrieve the item from the back storage area. Further still, comparing prices and features of different products in a physical store requires physically moving between different sections or stores, which can be tiring and time-consuming. Moreover, physical stores can become crowded, especially during peak shopping times or sales events. Dealing with large crowds can be frustrating, as it can make it harder to move around the store, find assistance, or check out. Waiting in long lines at the checkout counter is also a common inconvenience in physical stores. Finally, while physical stores usually have staff available to help, the assistance they provide may not always be comprehensive or readily available. They might be busy attending to other customers, or their knowledge of the products may be limited.

In one approach, an e-commerce platform may be provided by way of a web interface to address some of the shortcomings of in-person shopping. However, web interface approaches lack an immersive experience for a user to physically interact with the products. The inability to touch and feel a product while shopping makes it more difficult to visualize and appreciate the products, which are important factors for making a purchase. As part of a quality shopping experience, humans are also naturally inclined to interact directly with each other (e.g., face to face), such as to ask questions or converse with store employees. However, in a web interface approach, a shopper is also unable to socially interact in such a way with a staff member for shopping assistance.

In one approach, a virtual reality (VR) interface may be provided to enable a shopping experience. The VR interface may provide a virtual environment meant to mimic a physical brick-and-mortar establishment. In such an interface, a user might virtually navigate through and around the VR store, viewing virtual representations of items on store shelves, "grabbing" the virtual representations, and virtually moving to a check-out area where the user can purchase the items. However, navigating through VR stores (e.g., teleporting, walking, and other mobility modes) can be cumbersome to the shopping experience. For example, a shopper may want to shop for products for renovating their bathroom vanity. The shopper may select a particular vanity. The shopper may also want to purchase a faucet that matches the vanity. However, the shopper would have to teleport through the many aisles of the VR store to find the section for faucets. By the time the shopper arrives at the faucet aisle, they may need to determine which faucet is compatible with their selected vanity. To compare dimensions and styles of the faucets with the vanity, the shopper may have to teleport back and forth between aisles and memorize details of multiple faucets.

In one approach, e-commerce platforms may recommend products that are frequently bought together to help the shopper decide which products they wish to purchase. However, such techniques can overlook new products (which have little to no purchase history) or other relevant but unknown products, leading to an unsuccessful shopping experience where the shopper does not find all of the products they need.

In an embodiment, a product recommendation may be provided, via a shopping interface, by determining a "product use" (also referred to as intended use) for a product of interest that has been identified for a user, identifying one or more recommended additional products based on that "product use," and providing a recommendation for the one or more recommended products. Examples of a "product use" include an activity (e.g., a project, task, job, etc.) involving use of the product of interest, consumption of the product of interest, operation of the product of interest, installation of the product of interest, and the like. For example, a user may select a bathroom vanity (e.g., the product of interest), and the product use may be determined as a bathroom vanity renovation project. Products which supplement the product of interest in accomplishing the product use are identified as associated products. For example, associated products for a bathroom vanity renovation project can include faucet, pipe wrenches, putty, etc. Such associated products are recommended to the user by way of an optimized virtual store. A user may purchase the recommended product(s), helping the user avoid forgetting to purchase product(s) that they may want or need and saving the user time and effort that might otherwise be expended searching for or researching the recommended product(s). Unlike the "frequently bought together" feature, for example, the disclosed techniques can be implemented to recommend relevant products that are not typically purchased with the product of interest. For example, a new product that has never been purchased might be recommended based on its association with the identified "product use." As another example, a relatively unknown (but highly relevant) product may be recommended based on its association with the identified "product use." The disclosed techniques can also be implemented to recommend relevant products based on the compatibility of the products with the product of interest with respect to the product use. For example, supply pipes and drain pipes that are needed to accomplish the bathroom vanity renovation project and which have dimensions that are compatible with the dimensions of the selected vanity may be recommended.

In an embodiment, an optimized virtual store is generated based on the product of interest, product use, and the recommended product(s).

In an embodiment, the shopping interface may be an interface that provides 2D or 3D content. In an embodiment, the shopping interface is an XR interface, such as a VR interface (e.g., provided by way of a VR headset). Where the shopping interface is a VR interface, a virtual representation of a store is provided to the user. When the user selects a product of interest, the optimized virtual store is automatically generated and displayed via the VR interface, recommending the appropriate relevant products. In another embodiment, where the shopping interface is another XR interface, such as an AR interface (e.g., provided by way of AR glasses or smartphone), a user can shop in a physical store, select a real-world product of interest through the AR interface, and the optimized virtual store (e.g., displaying product recommendations) can be overlaid within the view field of the AR interface.

In an embodiment, disclosed techniques may be implemented to determine, in real-time, a portion of a VR model of a store for a virtual shopping interface responsive to identifying a product of interest for a user. The VR model may include, or may be based on, a planogram.

A benefit of the described methods and systems includes saving time, energy, and frustration from needing to navigate back and forth through multiple aisles in a physical store or virtual store to reach a desired location to find or browse a product. The user would also not need to open and manage multiple browser windows (e.g., when shopping via web-based interface). Another benefit includes saving time and energy in researching which products are compatible with each other and distinguishing which products are required or optional to be purchased with each other in accomplishing a product use.

Another benefit includes providing vendors an easy and non-intrusive way to upsell products. Yet another benefit includes providing an optimized virtual store layout to the user without changing the authored virtual store model (e.g., without altering or reauthoring the original virtual store model from an e-commerce vendor).

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
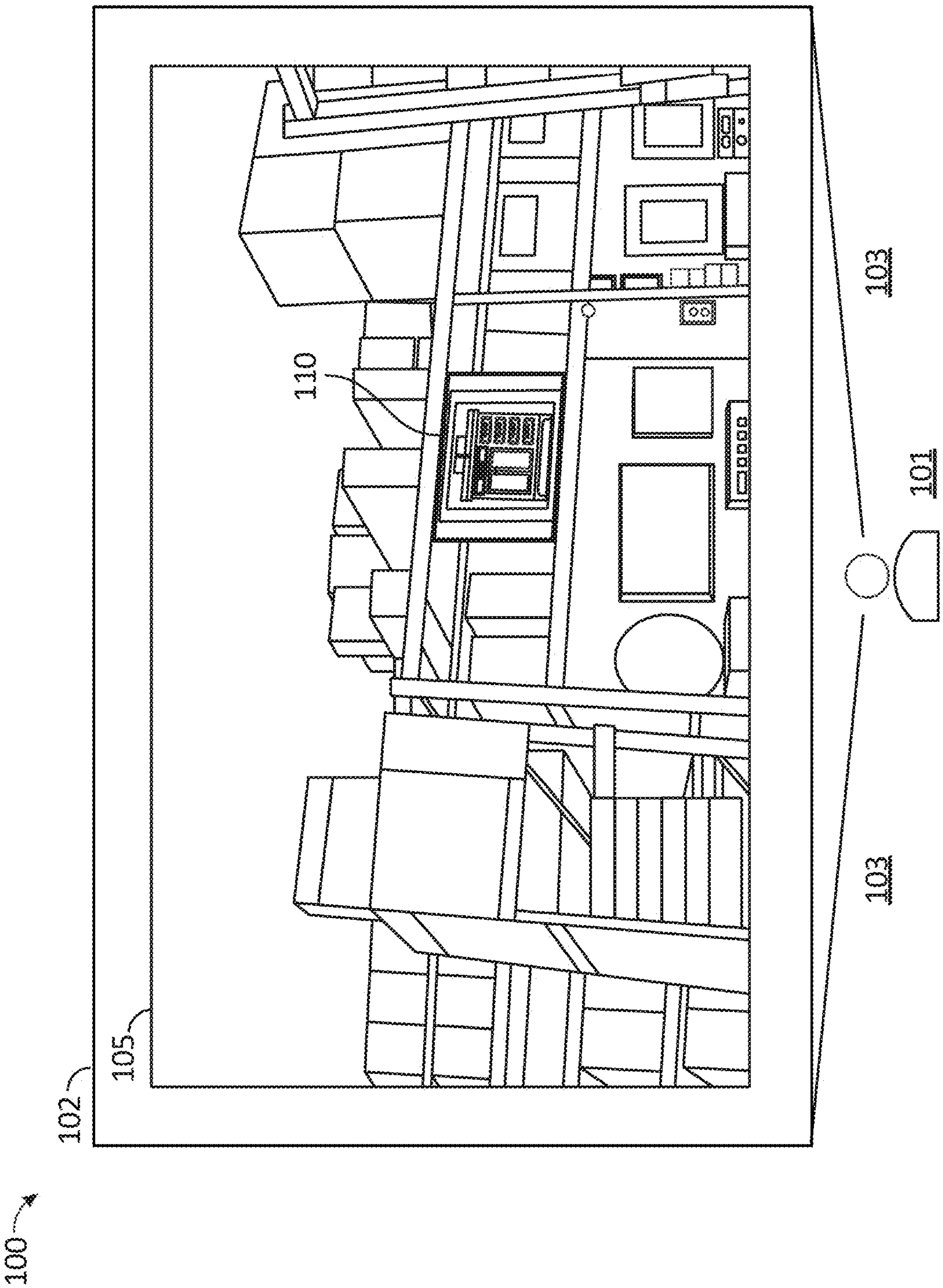
FIG. 1A depicts an illustrative scenario of selecting a product of interest in a virtual store in its default view, in accordance with some embodiments of the disclosure.

FIG. 1A depicts an illustrative scenario 100 of selecting a product of interest 110 in a virtual store 105 in its default view, in accordance with some embodiments of the disclosure. In an embodiment, the scenario 100 comprises user 101, view field 102, view boundaries 103, virtual store 105 (e.g., in its default view), and a product of interest 110. In an embodiment, user 101 can shop through virtual store 105 by way of an XR device (e.g., XR device 210 of FIG. 2), such as a VR headset, AR glasses, smartphone configured with AR capabilities, or other suitable device that provides a VR or AR interface. The XR device is configured to receive and render a virtual reality model (e.g., virtual store 105) of a store. In another embodiment, user 101 can view and browse the virtual store 105 by way of an interactive webpage. In the example, user 101 can view portions of the virtual store 105 within a view field 102 (also referred to as a field of view). The range of view field 102 is bound by view boundaries 103. Thus, at any given position of user 101, the user 101 can view a portion of the virtual store 105 up to the view boundaries 103. In some embodiments, view boundaries 103 are determined by the limits of human peripheral vision. In other embodiments, view boundaries 103 are determined based on preconfigured settings of the XR device, preconfigured settings of the virtual store 105, user preferences with respect to the XR device and/or user settings for the virtual store 105, etc.

In an embodiment, virtual store 105 comprises a virtual reality model of a real-world store (such as a brick-and-mortar store). The virtual store 105 may replicate the physical layout of the real-world store. In another embodiment, the virtual reality model may comprise (or be based on) a planogram of a real-world store. In the example, user 101 shops virtual store 105 in its default view (e.g., as the virtual reality store model is originally presented) using a VR device. Upon selecting a product of interest 110, an optimized virtual store 155 (e.g., an optimized view of the virtual store 105 displaying recommended products from other locations within the virtual store) may be automatically presented in the view field 102. In another example the user 101 is in a physical store, uses an AR device to select a real-world product of interest, and the optimized virtual store is automatically overlaid on the view field 102 from the user's current location in the physical store without the user needing to physically navigate the aisles. Selecting the product can also add the product to the user's cart. In an embodiment, the optimized virtual store 155 displays the selected product of interest and recommended products according to an optimized layout. The optimized virtual store 155 is discussed in further detail in FIG. 1B.

A product may be selected through the VR interface or AR interface in various ways. In an embodiment, cameras, sensors, or other suitable user interface components are coupled to the XR device to detect user gestures, motions, or other suitable user action and/or user input indicating selection of a product as displayed on the view field 102. For example, cameras and/or sensors such as gyroscopes, accelerometers, magnetometers, etc., may detect the user 101 gestures or motions (e.g., pointing, grabbing, circling, etc.) indicating selection of the product of interest 110. In another example, microphones and/or voice assistant, controller, touchscreens, etc., may be used for receiving user input indicating selection of the product of interest (e.g., user 101 may press a button, tap an icon, or speak a command to select the product of interest 110).

In conjunction or in the alternative, a product may be selected based on detected user interest in the product. For example, inward facing cameras may be used to detect the user's 101 gaze on a product. A product may be selected if the user's gaze is held on the product for a threshold period of time. In another example, the length of the gaze can be combined with contextual information, such as user historical data and/or user profile data (e.g., whether the user has browsed or purchased similar products in the past or has engaged in the product use or similar product use associated with the selected product). In yet another example, gyroscopes, accelerometers, or other inertial sensors may detect body movements indicating user's interest in the product (e.g., the user turns toward an item with a particular speed and/or remains facing the item for a period of time). In another example, microphones can be used to receive speech input from the user suggesting user interest (e.g., "Show me more", "What are the dimensions?", "Which is the newest version?", "Which one would fit in the size of my bathroom?", etc.).

In the example, user 101 selects product of interest 110 (e.g., a bathroom vanity). According to some embodiments, when user 101 selects product of interest 110, a product use (also referred to as intended use) associated with the product of interest 110 is identified. For example, a product use may be an activity (e.g., a project, task, job, etc.) involving use of the product of interest, consumption of the product of interest, operation of the product of interest, installation of the product of interest, and the like. In an embodiment, the product use is one in which the associated product of interest is a crucial component (or one of a plurality of crucial components). For instance, if user 101 enters the virtual store 105 with the intention to replace their bathroom vanity (e.g., as part of a bathroom remodeling project), one of the crucial components for replacing the bathroom vanity includes a new vanity (e.g., a vanity renovation project cannot be performed without the new vanity otherwise). Thus, when user 101 selects a new vanity, the system may identify, based on the selected vanity, that an associated product use is a vanity renovation project. In another instance, if a user is shopping virtual store 105 for products to complete an automotive brake job, a crucial component of an automotive brake job is the brake pads, because a brake replacement cannot be performed without new brake pads. Thus, when the user selects the brake pads, the system may identify, based on the selected brake pads, that an associated product use is an automotive brake job.

In an embodiment, the product use may be determined based on various factors or a combination thereof, such as: data associated with the product of interest (e.g., instructions, manuals, product number (such as SKU, UPC, serial number, and the like) or packaging associated with the product of interest); established commercial or industry uses for the product of interest; public data on most common and/or trending ways to use the product of interest; data associated with similar product to the product of interest (e.g., same type of product under another brand or having a different model or version, etc.); user activity data (e.g., shopping history, product browsing history, product use history, user's calendars, conversations, communications or other suitable user activities which indicate the user's intended product use for the product of interest); user's profile information, user's environment, temporal data (e.g., when the user 101 intends to use the product of interest, whether use of the product of interest 110 is time sensitive, whether a product of interest has a different product use depending on the time of year, etc.), predetermined for the virtual store 105, among others. In some embodiments, a product of interest 110 may be associated with more than one product use. The determination for which product use from a plurality of product uses is appropriate for the user may be made based on any of the aforementioned factors for determining the product use. In some embodiments, a plurality of product uses may be indexed in a database (e.g., a products datastore, not shown), and the associated product use(s) may be stored as metadata associated each product of interest.

In an embodiment, products (other than the product of interest) which are associated with the product use are identified as associated products. Associated products supplement the product of interest in accomplishing the product use. A product is determined to be an associated product (e.g., manually, by an algorithm, a model such as a trained machine-learning model, etc.) based on various factors or a combination thereof. Such factors may include the product of interest, the product use, the time and/or environment for the purchasing the product of interest and/or performing the product use, metadata associated with the product of interest, among others. An associated product may be manually selected. For example, an associated product may be selected by an entity associated with the virtual store 105. In an embodiment, associated products may be identified based on product uses that have been "crowd sourced." For example, customers may identify associated products. If a given number of customers (e.g., 100), or a certain percentage of customers that buy the product of interest (e.g., 60%), identify a given product as having or being associated with a given intended use, the given product may be considered "associated." In some instances, associated products may be automatically identified based on purchase histories of customers (e.g., an intended use may be more confidently selected based on a group of items purchased by a person). In any event, product uses or intended uses may be identified and used to identify associated products.

For example, where the product of interest is a bathroom vanity and the product use is a vanity renovation project, associated products may include a faucet, supply pipe, drain pipe, putty, pipe wrench, mirror, towel ring, etc. In conjunction or alternatively, associated products comprise products which are related to the product of interest (e.g., referenced by the product of interest, automatically paired based on industry standards or other suitable predefined configurations, etc.). For example, where the product of interest is a bathroom vanity, the packaging may, for demonstration purposes, also depict an image of a faucet affixed to the completed bathroom vanity, even though purchase of the product of interest does not include a faucet. Thus, a faucet may be determined as an associated product (e.g., by an algorithm, a model such as a machine-learning model, etc.). In another example, the faucet may be automatically identified as an associated product because the instruction manual and/or metadata associated with the product of interest references installation of a faucet, which is sold separately from the vanity.

Each product may be associated with a level of importance (also referred to as product importance level) or relevance to a product use, or another suitable factor. Generally speaking, the terms "importance" and "level of importance" carry the same meaning as "relevance" and "level of relevance," respectively. The product importance level of the product may comprise (or be based on) its status with respect to the identified product use. For example, the product may be a selected product (e.g., the product of interest used for identifying the product use), associated products may be required or optional for accomplishing the product use, there may be a degree of difficulty in finding the product in the virtual store (e.g., composite score, discussed in further detail in FIG. 7A), or other suitable status with respect to its role or relevance in accomplishing the product use. In an embodiment, an associated product is required if it is essential for the product use. In an embodiment, an associated product is optional if it contributes to accomplishing the product use but the product use can nonetheless be performed without the optional product. For example, for a vanity remodeling project, where the user has selected a bathroom vanity as the product of interest, required products may include a faucet, supply pipe, drain pipe, and pipe wrench. Optional products may include plumber's putty, sealant tape, and drain stopper. In some embodiments, the status of the associated product may be determined based on various factors or a combination thereof, such as: data associated with the product of interest (e.g., product specifications, instructions, manuals, etc.); data associated with the product use (e.g., industry or commercial standards, specifications for product use, etc.), data associated with the virtual store (e.g., whether the product is a new or emerging product that the virtual store is promoting), among others. A list of associated products and their respective statuses can be stored as metadata associated with the product use in a database (e.g., jobs datastore 230).

Figure 1B:
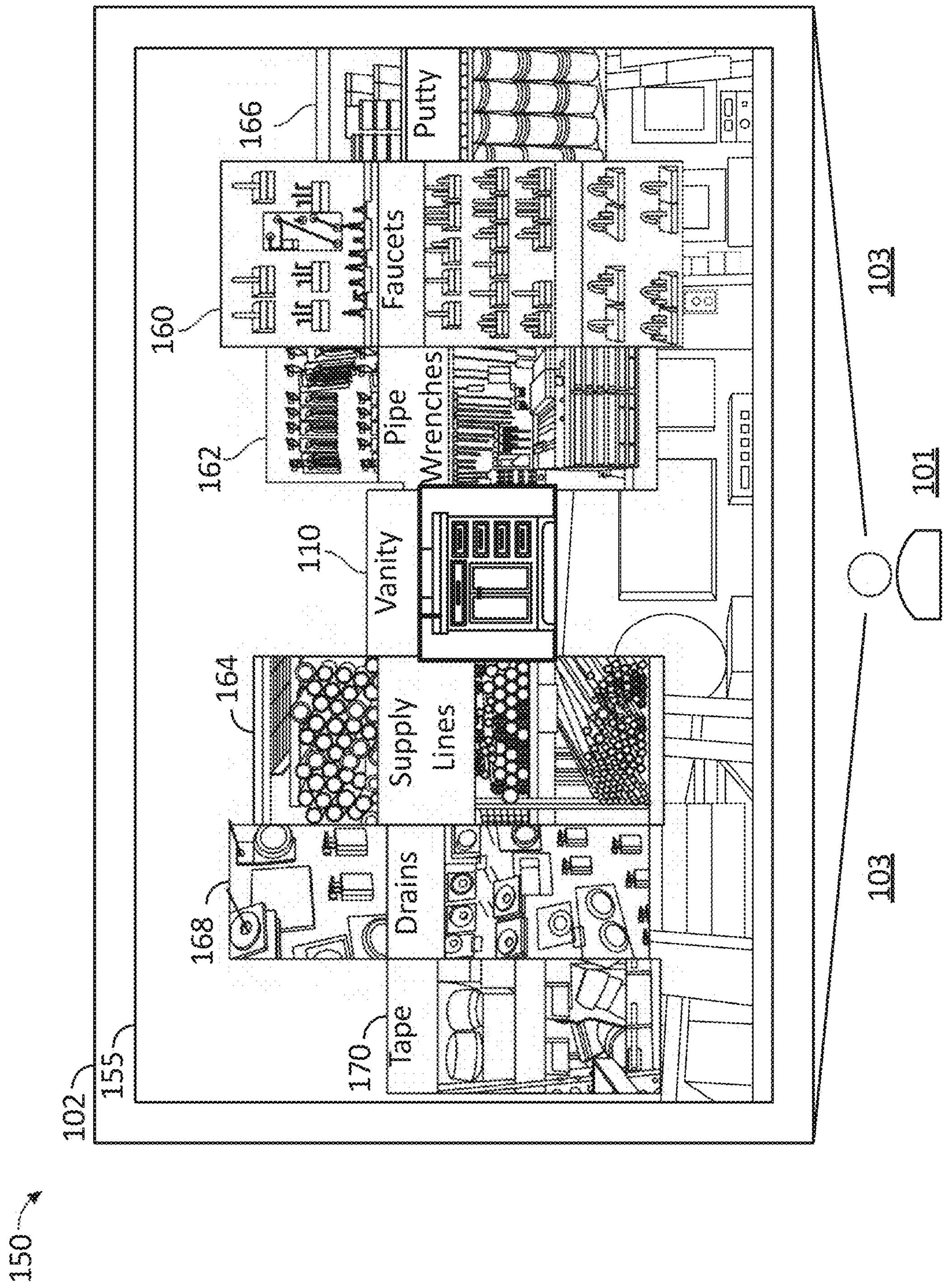
FIG. 1B depicts an illustrative scenario of providing product recommendations in an optimized virtual store (e.g., in an optimized view of the virtual reality store), in accordance with some embodiments of the disclosure.

FIG. 1B depicts an illustrative scenario 150 of providing product recommendations in an optimized virtual store 155 (e.g., in an optimized view of the virtual reality store), in accordance with some embodiments of the disclosure. In an embodiment, the scenario 150 comprises user 101, view field 102, view boundaries 103, optimized virtual store 155, product of interest 110, and associated products 160, 162, 164, 166, 168, and 170 which are recommended to user 101. Continuing from the example in FIG. 1A, user 101 previously selected product of interest 110 (e.g., bathroom vanity) within virtual store 105 (e.g., in its default view). A product use (e.g., vanity renovation project) was identified based on the product of interest 110. Associated products were identified based on the product use. In the example, the associated products include required products for the product use (e.g., faucets 160, pipe wrenches 162, and supply lines 164) and optional products for the product use (e.g., putty 166, drain stoppers 168, and sealant tape 170). As illustrated in FIG. 1B, upon user 101 selecting the product of interest 110, optimized virtual store 155 may be automatically displayed within the view field 102, replacing the default view of virtual store 105. In an embodiment, optimized virtual store 155 comprises a layout that is optimized for assisting the user 101 in shopping for products to accomplish the product use.

In an embodiment, optimized virtual store 155 is dynamically rendered based on various factors or a combination thereof, such as: user interaction with the selected product of interest 110, product use, associated products; user activity and/or history; and so forth. In the example, optimized virtual store 155 displays the selected product of interest 110 (e.g., bathroom vanity 110) in the center of view field 102. Optimized virtual store 155 also recommends associated products (e.g., faucets 160, pipe wrenches 162, supply lines 164, putty 166, drain stoppers 168, and sealant tape 170) by way of displaying them in various placements near the product of interest 110. Further in the embodiment, alternatives to the product of interest and/or the associated products may be displayed in the optimized virtual store 155. In an embodiment, an alternative product can be one that is suitable for replacing the product in accomplishing the product use. For example, alternatives to the vanity 110 may include different types of vanities (e.g., as vanities of different brands, models, styles, dimensions, sizes, etc.) and/or similar products to vanities (e.g., such as pedestal sinks or medicine cabinets, etc.). The vanity alternatives can be displayed with the vanity 110 (for instance, above and below vanity 110 such that user 101 can browse the alternatives by scrolling vertically within a column). In another example, alternatives to putty 166 may include different kinds of putty (e.g., putties of different brands, container sizes, colors, etc.) and/or similar products to putty (e.g., silicon caulk, epoxy, etc.). Alternatives which are available (e.g., in stock) from the virtual store may be recommended and displayed.

In an embodiment, the system determines which of the identified associated products to recommend to the user 101. Associated products may be recommended (e.g., to be displayed) in the optimized virtual store 155 based on various factors. For example, the associated product may be recommended based on its product importance level or status (e.g., whether the associated product is required or optional for the product use). In another example, the associated product may be recommended based on metadata associated with the product of interest and/or the associated product (e.g., whether the associated product is included with the purchase of the product of interest 110, whether the associated product is compatible with the product of interest 110, whether the product is under a private-label brand of the virtual store 105, etc.). For instance, if the packaging for vanity 110 is bundled with a matching faucet, then faucets 160 would not be recommended and would therefore not be displayed in optimized virtual store 155. Contrastingly, if the packaging for vanity 110 does not include a faucet, then faucets 160 would be recommended and displayed in optimized virtual store 155. In yet another example, if the vanity 110 has particular dimensions, the supply lines which have compatible dimensions may be recommended. Meanwhile, although supply lines are required for the vanity renovation project, the supply lines which are not compatible with the dimensions of the selected vanity will not be recommended.

In another example, the associated product may be recommended based on user data, such as user preferences, purchase history (e.g., whether the user already possesses and/or has access to the associated product), or other suitable user information indicating that the user might be interested in and/or be likely to purchase the product from having the product recommended to him. For instance, suppose user preferences indicate that user 101 prefers chrome finishing (or his profile information or purchase history indicates that other parts of his bathroom (e.g., mirrors, towel ring, and shower door frame) have chrome finish), despite a complimentary brass faucet being included with the marble vanity 110 as a bundle. It may therefore be determined that user 101 would be interested in discarding the complimentary brass faucet and purchasing a chrome faucet. Thus, faucets 160 would be recommended and displayed in optimized virtual store 155. In another instance, if information from a user profile associated with user 101 indicates that he works for a remodeling company and has access to company tools such as pipe wrenches, then the optimized virtual store 155 may not include pipe wrenches 162 in the display of recommended products. In another example, the associated product may be recommended based on data associated with the virtual store 105, such as store inventory (e.g., the quantity of the product available, the next restocking date for the product, etc.).

In some embodiments, optimized virtual store 155 displays the product of interest and recommended associated products based on an optimized layout. The optimized layout may be a layout that accounts for relevance of products items (e.g., based on user interactions with products, user interest in products, products uses, etc.). The optimized layout may comprise designating sections (e.g., positions) of the view field 102 for displaying each of the products. The sections may be arranged in various designs, such as columns, rows, grids, circular diagrams, spider diagrams, designs based on the human view field (described in further detail in FIG. 6), user preferences, preconfigured settings of the virtual store 105, among others. Each section may be associated with a section importance level (e.g., position importance level), based on its presentation and/or position in the view field 102. Different products are displayed in different sections based on correlating the product importance level of the product with the section importance level of the section. In an example, the product importance level of the product may comprise or be based on its status (e.g., product of interest, required associated product, or optional associated product), the composite score of the product (e.g., a score based on the location of the product in the virtual store 105 and/or the quantity of the product and its alternatives available in virtual store 105, discussed in further detail in FIG. 7A), or other suitable factor.

In an embodiment, the products displayed over the optimized layout may also be presented with a respective display characteristic(s). The display characteristic(s) associated with each product may include centrality (e.g., how close the product is to the center of view field 102), spatial placement (e.g., position on view field 102), prominence (e.g., object size), depth, luminosity, coloring, transparency, focus, labeling, among others. In conjunction or in the alternative, the optimized layout and/or the display characteristics of the products may change dynamically based on user's 101 interaction (e.g., selecting or demonstrating interest) with the product of interest 110 or any of the recommended associated products 160, 162, 164, 166, 168, 170.

Figure 2:
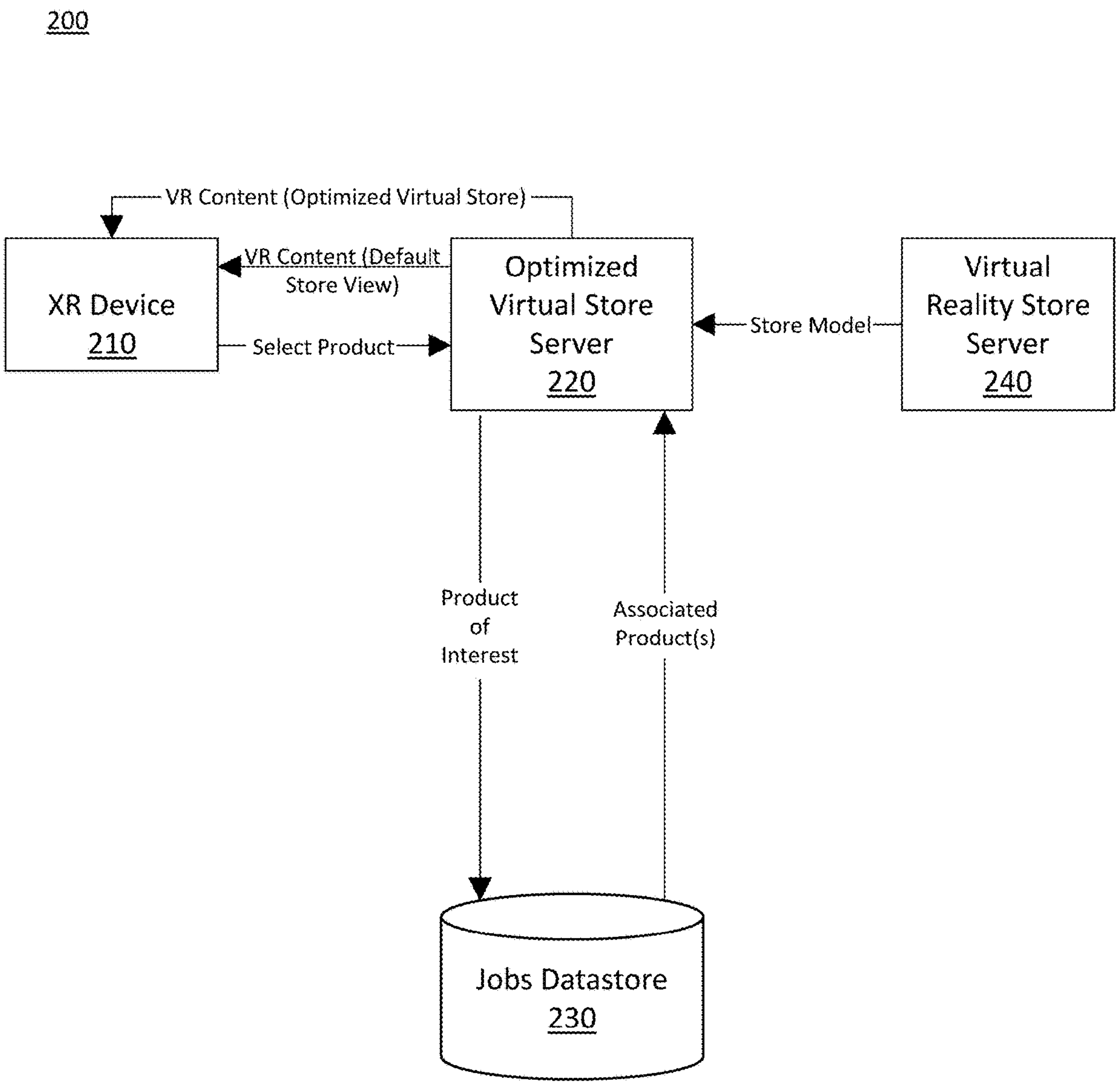
FIG. 2 depicts an example architecture of a system for providing product recommendations in an optimized virtual store, in accordance with some embodiments of the disclosure.

FIG. 2 depicts an example architecture 200 of a system for providing product recommendations in an optimized virtual store, in accordance with some embodiments of the disclosure. In an embodiment, the architecture 200 comprises XR device 210, optimized virtual store server 220, jobs datastore 230, and virtual reality store server 240.

In some embodiments, XR device 210 is operable to interface between a user and a virtual store. XR device 210 can comprise any device (e.g., virtual reality (VR), augmented reality (AR), mixed reality (MR), etc.) suitable for providing a VR (or AR or MR) interface. XR device 210 may be configured to receive a virtual model of a store (e.g., virtual reality store 105 or optimized virtual store 155) from VR store server 240 and/or optimized virtual store server 220. XR device 210 includes a display through which the virtual store is presented to the user. In another embodiment, XR device 210 comprises a computing device configured to receive a virtual store model by way of an interactive webpage, or other suitable device allowing user 101 to interface with virtual store 105.

In an embodiment, XR device 210 includes sensors, cameras, or other suitable user interface components for receiving or user input and/or capturing user speech or actions. For instance, cameras and/or sensors (e.g., gyroscopes, accelerometers, magnetometers, etc.), can detect user actions that indicate selection of a product displayed in the virtual store. Such actions can include, for example, gestures or motions such as pointing, grabbing, circling, etc. In another instance, microphones and/or voice assistant, controllers, touchscreens, etc., may be coupled with XR device 210 for receiving input from the user. For example, the user may select a product in the virtual store by pressing a button on a controller, tapping a graphical control on a touchscreen, or providing a speech command.

In an embodiment, if a user demonstrates interest in a displayed product, then the product may be automatically selected. For example, inward facing cameras of XR device 210 may be used to detect the user's gaze on a product. A product selection may be automatically made if the user's gaze is held on the product for a threshold period of time. In another example, the length of the gaze can be combined with contextual information, such as user historical data and/or user profile data (e.g., whether the user has browsed or purchased similar products in the past or has engaged in the product use or similar product use associated with the selected product). In yet another example, gyroscopes, accelerometers, or other inertial sensors may detect body movements indicating user's interest in the product (e.g., the user turns toward an item with a particular speed and/or remains facing the item for a period of time). In another example, microphones can be used to receive speech input from the user suggesting user interest (e.g., "Show me more", "What are the dimensions?", "Which is the newest version?", "Which one would fit in the size of my bathroom?", etc.).

User action data collected by XR device 210 is transmitted to optimized virtual store server 220, which identifies the product of interest selected by the user and generates an optimized virtual store based on the product of interest, the product use identified based on the product of interest, and associated products corresponding to the product use.

In some embodiments, jobs datastore 230 is operable to store data associated with product uses. The product of interest (e.g., selected by the user via the XR device 210) is associated with a product use(s). A product use may be an activity (e.g., a project, task, job, etc.) involving use of the product of interest, consumption of the product of interest, operation of the product of interest, installation of the product of interest, and the like. In an example, a list of product uses may be stored in jobs datastore 230. Each product use is associated with a plurality of products. The plurality of products can comprise a product of interest(s) and/or an associated product(s). Each of the plurality of products may have a status with respect to the product use (e.g., product of interest, required, or optional). A list of the plurality of products (or other product identifying data, such as product name, product image, serial number, etc.) and their respective statuses may be stored in the metadata associated with each product use. In an embodiment, a product of interest associated with a product use is a product which is a crucial component to the product use. An associated product is a product which supplements the product of interest in accomplishing the product use. Further, the associated product may be required or optional for accomplishing the product use.

In another embodiment, the system architecture 200 can additionally include a products datastore (not shown), which stores data associated with a list of products and is connected to the jobs datastore 230. A corresponding product use(s) may be associated with each product. Thus, when the user selects a product as the product of interest, optimized virtual store server 220 may query the products datastore for the product of interest to determine the product use, and query the jobs datastore 230 for the associated products corresponding to the product use.

In an embodiment, virtual reality store server 240 is operable to provide a virtual model of a store (also referred to as a virtual store or VR store). In an embodiment, virtual reality store server 240 may provide the virtual model to optimized virtual store server 220, which the optimized virtual store server 220 provides XR device 210 with the virtual store (e.g., a default view based on the original layout) or an optimized virtual store (e.g., an optimized view based on an optimized layout, discussed further below). In another embodiment, virtual reality store server 240 may provide the virtual store (e.g., default view based on the original layout) directly to XR device 210. Virtual reality store server 240 may be associated with an e-commerce vendor. The virtual store may mirror a real-world store of the vendor, including aisles, aisle sections, geometric descriptions of the store layout (e.g., which aisle sections are adjacent to each other, etc.) and descriptions of products sold in the aisle sections. In another embodiment, the virtual store reflects the current collective inventory of multiple locations or branches of a single e-commerce vendor. In yet another embodiment, virtual reality store server 240 may be associated with an e-commerce aggregator. For example, an e-commerce aggregator may author and provide a virtual model of a single store that is populated with products drawn from multiple vendors. In another example, the e-commerce aggregator may combine virtual models of multiple stores of the vendors and provide an aggregated virtual store to optimized virtual store server 220.

In an embodiment, the original layout of the virtual store may be updated in real-time to reflect the current inventory of the real-world store. For example, as a user moves through a VR store (e.g., via a default view of the VR store), the original layout of the VR store may be updated automatically if the vendor runs out of a certain product, replenishes products, or introduces new products to the VR store. As will be described below, when the user interacts with products in the VR store (e.g., when user 101 selects or demonstrates interest in a product), optimized virtual store server 220 generates an optimized layout of the VR store and replaces the default view (e.g., original layout) of the VR store with an optimized view of the VR store (e.g., optimized virtual store based on the optimized layout).

In an embodiment, optimized virtual store server 220 is operable to communicate with XR device 210, generate an optimized virtual store, and facilitate user interaction with the optimized virtual store. Optimized virtual store server 220 may receive a virtual model of a store from virtual reality store server 240 and stream the virtual store (e.g., in its original layout; e.g., in its default view, such as virtual reality store 105) to XR device 210 for a user to shop through. Optimized virtual store server 220 may also replace or modify the original layout with an optimized virtual store (e.g., an optimized layout based on virtual reality store 105, such as optimized virtual store 155) based on user interactions with the virtual store. For example, as a user moves through a VR store, the store layout may consistently and dynamically update in response to each user interaction (e.g., user gaze at products, user selection of products, etc.).

Upon receiving a user selection of a product of interest, optimized virtual store server 220 identifies a corresponding product use based on the product of interest, for example, by querying jobs database 230. In another embodiment, the product use may be determined based on the product of interest (e.g., instructions, manuals, product number, or packaging associated with the product of interest, established commercial or industry uses for the product of interest, public data on most common and/or trending ways to use the product of interest; products similar to the product of interest); user data (e.g., user profile, user's environment, shopping history, product browsing history, product use history, activities indicating the user's intended product use for the product of interest); and so forth.

Once the product use is determined, optimized virtual store server 220 can query jobs database 230 to determine associated products of the product use. In another embodiment, optimized virtual store server 220 determines the associated products based on data associated with the product of interest and/or data associated with the product use, among others.

Optimized virtual store server 220 determines which associated product to recommend to the user based on the status or other data of the associated product, data associated with the product of interest, user data (e.g., user profile, preferences, activity, purchase history, etc.), data associated with virtual store, and so forth. Optimized virtual store server 220 generates an optimized virtual store based on an optimized layout, which displays a specific arrangement of the product of interest and the recommended associated products. The optimized virtual store is transmitted to XR device 210 for the user to continue shopping for products for the product use.

When the user selects another product in the optimized virtual store (for instance, the user selects one of the recommended products), XR device 210 will process the user action and send the selection data to optimized virtual store server 220. Optimized virtual store server 220 dynamically modifies the optimized virtual store based on the recent user action and transmits the modified optimized virtual store to XR device 210.

As an illustration of the functions of the architecture 200 components, virtual reality store server 240 may provide a virtual model of a hardware store. Optimized virtual store server 220 streams the virtual hardware store to XR device 210. A user of the XR device 210 shops through the virtual hardware store and selects a bathroom vanity as the product of interest. Optimized virtual store server 220 receives the selection data. Using the selection data (for example, name or image data of the bathroom vanity), optimized virtual store server 220 queries jobs datastore 230 for a product use corresponding to the bathroom vanity, and determines the product use to be vanity renovation project. Further, data for associated products for a vanity renovation project is retrieved from jobs datastore 230. Example associated products can include a faucet (required for accomplishing the vanity renovation project) and putty (optional for accomplishing the project). Optimized virtual store server 220 determines that because a faucet is required for the vanity renovation project, the bathroom vanity does not include a faucet with purchase, and the user does not already possess a faucet, then faucets should be recommended. Optimized virtual store server 220 may also determine that because putty is optional, the user already possess putty from a recent purchase and which has not yet expired, the putty does not need to be recommended. Optimized virtual store server 220 generates an optimized virtual store based on an optimized layout, displaying the product of interest (e.g., the selected bathroom vanity) and the recommended associated products (e.g., the faucets). Upon further actions from the user in the optimized virtual store (e.g., user selects one of the recommended faucets), optimized virtual store server 220 dynamically modifies the optimized virtual store. For example, the vanity may be removed from view, the spatial placement of the faucet is moved to a different portion of the view field, and additional associated products (such as supply pipelines) are recommended and displayed.

Figure 3:
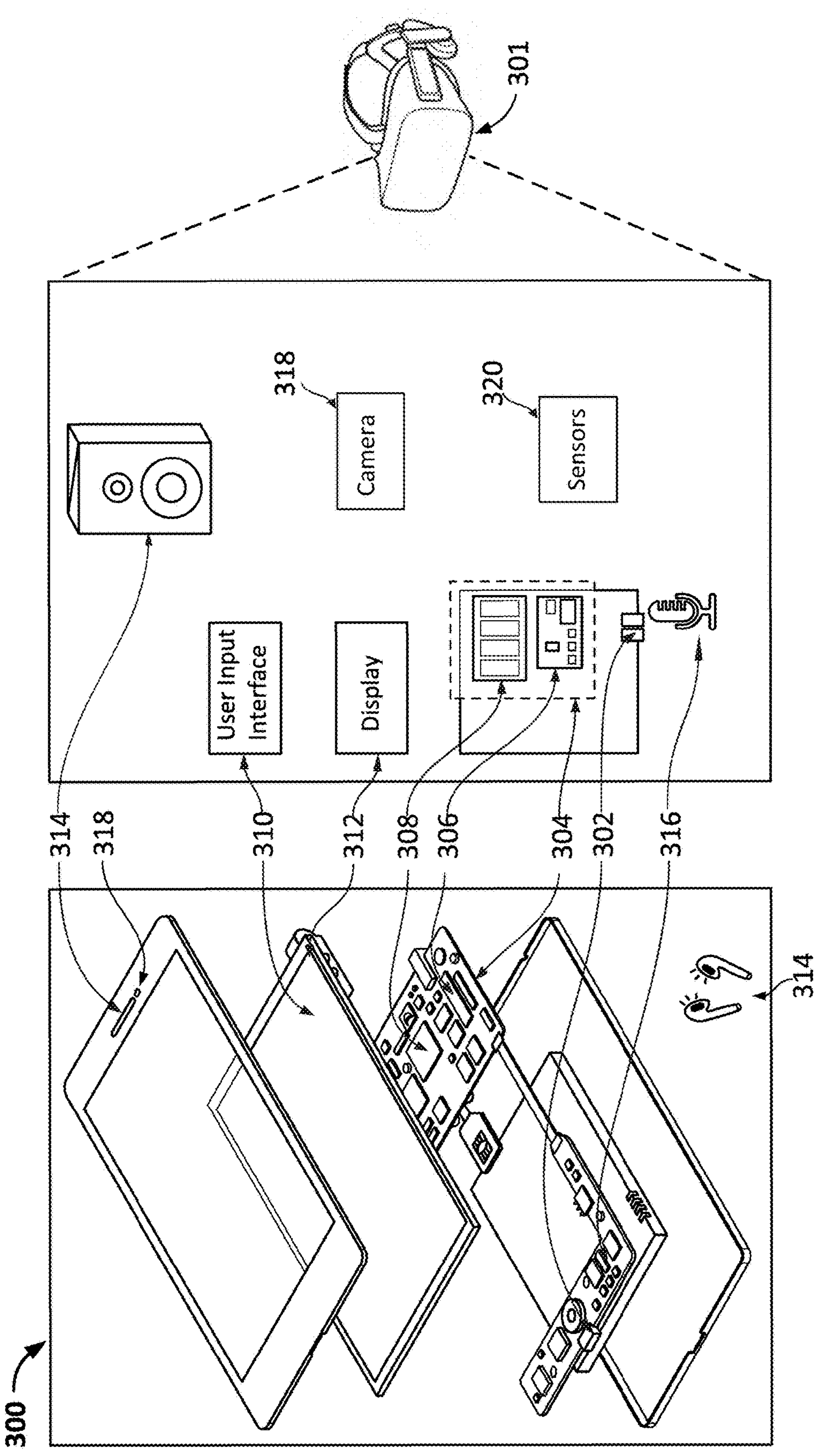
FIG. 3 depicts an illustrative user equipment of a system for creating and providing an optimized virtual store, in accordance with some embodiments of the disclosure.
Figure 4:
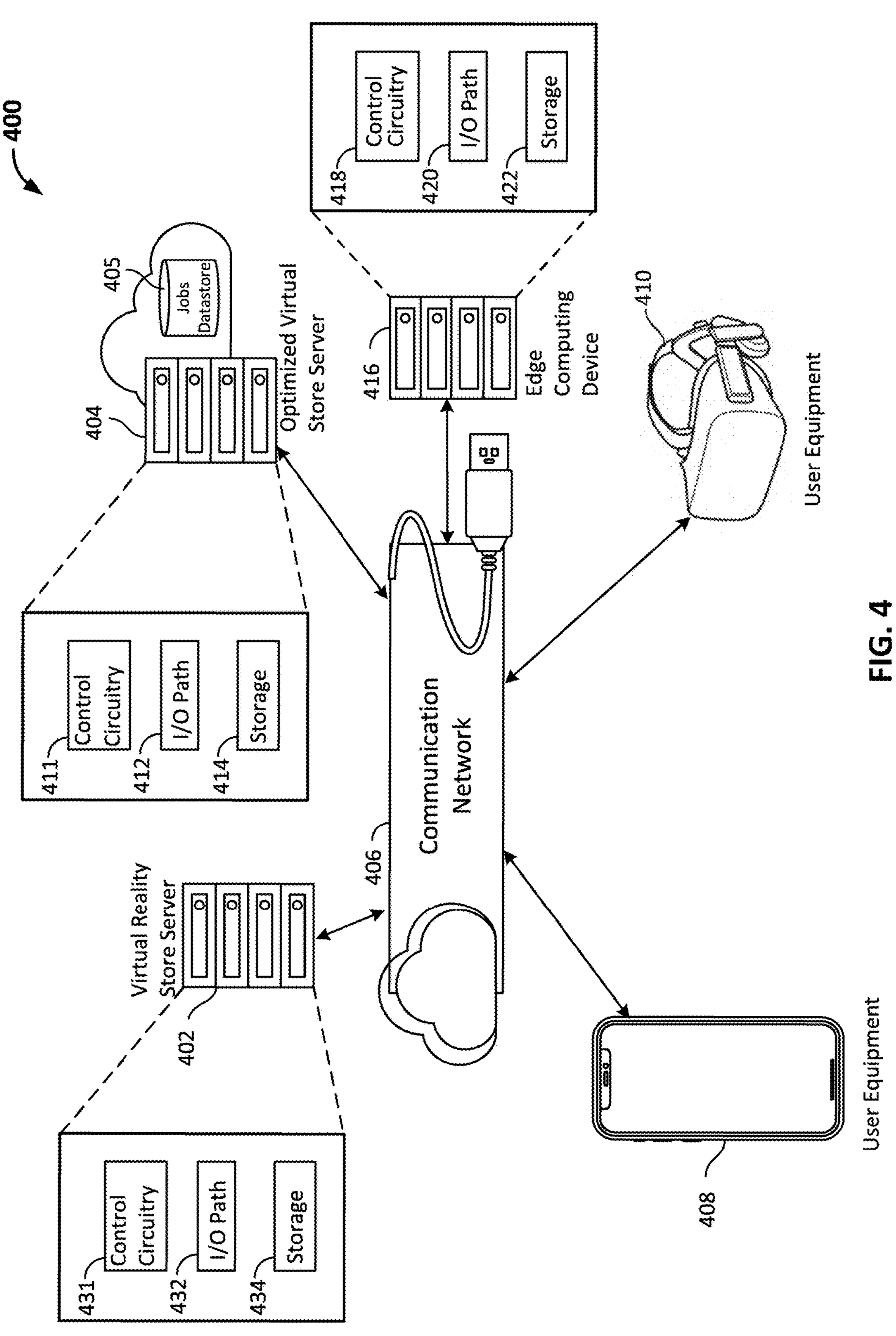
FIG. 4 depicts an illustrative system and related hardware for creating and providing an optimized virtual store, in accordance with some embodiments of the disclosure.

FIGS. 3-4 depict illustrative devices, systems, servers, and related hardware for creating and providing optimized virtual stores, in accordance with some embodiments of the disclosure. FIGS. 3-4 show generalized embodiments of illustrative user equipment devices 300, 301, 408, and 410, any one of which may represent an example of the XR device 210 shown in FIG. 2. The virtual reality store server 402 shown in FIG. 4 may represent an example of virtual reality store server 240 shown in FIG. 2 in some embodiments. The optimized virtual store server 404 shown in FIG. 4 may represent an example of optimized virtual store server 220 shown in FIG. 2 in some embodiments.

In FIG. 3, in one example, user equipment device 300 may be a smartphone, tablet, XR device, or any other suitable device capable of processing XR content. In another example, user equipment device 301 may be an XR device such as a VR headset, AR glasses, etc. Each of user equipment device 300, 301 may be communicatively connected to microphone 316, audio input equipment (e.g., speaker or headphones 314), camera 318, display 312, and user input interface 310. In a some embodiments, user equipment may also be communicatively connected to various sensors 320. Sensors 320 may include gyroscopes, accelerometers, magnetometers, biometric sensors, among others. In some embodiments, user input interface 310 may be a remote-control device. In some embodiments, Each one of user equipment 300, 301 may receive content and data via input/output (I/O) path (e.g., circuitry) 302. For instance, such content and data may be received by user equipment 300, 301, by way of microphone 316, camera 318, sensors, 320, user input interface 310, or other suitable component communicatively connected to user equipment 300, 301 for receiving input data. For instance, such content data may be rendered or output by user equipment 300, 301, by way of display 312, or other suitable component communicatively connected to user equipment 300, 301 for providing output. I/O path 302 may provide content (e.g., VR content, AR content, MR content, interactive web-based content, content over a local area network (LAN) or wide area network (WAN), and/or other content) and data to control circuitry 304, which may comprise processing circuitry 306 and storage 308. Control circuitry 304 may be used to send and receive commands, requests, and other suitable data using I/O path 302, which may comprise I/O circuitry. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing. While XR device 301 is shown in FIG. 3 and XR device 410 is shown in FIG. 4 for illustration, any suitable computing device having processing circuitry, control circuitry, and storage may be used in accordance with the present disclosure. For example, user equipment 301 may be replaced by or complemented by, a personal computer (e.g., a notebook, a laptop, a desktop), a smartphone (e.g., device 300 or 408), a tablet, a network-based sever hosting a user-accessible client device, a non-user-owned device, any other suitable device, or any combination thereof.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an XR application stored in memory (e.g., storage 308). Specifically, control circuitry 304 may be instructed by the XR application to perform the functions discussed above and below. For example, the XR application may include logic or instructions to render an XR environment, such as a virtual reality store. For example, the XR application may include logic or instructions for creating an optimized virtual reality store. For example, the XR application may include logic or instructions for dynamically updating the optimized virtual reality store in response to received (e.g., by way of I/O path 302) user interaction with the virtual reality store. In some implementations, processing or actions performed by control circuitry 304 may be based on instructions received from the XR application.

In client/server-based embodiments, control circuitry 304 may include communications circuitry suitable for communicating with a server or other networks or servers. The XR application may be a stand-alone application implemented on a device or a server. The XR application may be implemented as software or a set of executable instructions. The instructions for performing any of the embodiments discussed herein of the XR application may be encoded on non-transitory computer-readable media (e.g., a hard drive, random-access memory on a DRAM integrated circuit, read-only memory, etc.). For example, in FIG. 3, the instructions may be stored in storage 308, and executed by control circuitry 304 of a device 300, 301.

In some embodiments, the XR application may be a client/server application where only the client application resides on device 300, 301 and a server application resides on an external server (e.g., virtual reality store server 402 and/or optimized virtual store server 404) or edge service network. For example, the XR application may be implemented partially as a client application on control circuitry 304 of device 300, 301 and partially on virtual reality store server 402 and/or optimized virtual store server 404 as a server application running on control circuitry 411 and/or control circuitry 431, respectively. Virtual reality store server 402 and/or optimized virtual store server be a part of a local area network with one or more of devices 300, 301 or may be part of a cloud computing environment accessed via the internet. In a cloud computing environment, various types of computing services for performing searches on the internet or informational databases, creating and providing optimized virtual reality stores and providing product recommendations therein, providing storage (e.g., for a database) or parsing data (e.g., using machine learning algorithms) are provided by a collection of network-accessible computing and storage resources (e.g., virtual reality store server 402 and/or optimized virtual store server 404 and/or edge computing device 416), referred to as "the cloud." Device 300, 301 may be a cloud client that relies on the cloud computing capabilities from virtual reality store server 402 and/or optimized virtual store server 404 to determine whether processing (e.g., at least a portion of VR background processing and/or at least a portion of other processing tasks) should be offloaded from the XR device and facilitate such offloading. When executed by control circuitry of virtual reality store server 402 and/or optimized virtual store server 404 and/or edge computing device 416, the XR application may instruct control circuitry 431 and/or 411 and/or 418, respectively, to perform processing tasks for the client device and facilitate automatically generating an optimized virtual reality store and providing product recommendations therein.

Control circuitry 304 may include communications circuitry suitable for communicating with a server, edge computing systems and devices, a table or database server, or other networks or servers. The instructions for carrying out the above-mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, solid state devices, quantum storage devices, gaming consoles, gaming media, or any other suitable fixed or removable storage devices, and/or any combination of the same. Storage 308 may be used to store various types of content described herein as well as XR application data described above. Nonvolatile memory may also be used (e.g., to launch a boot-up routine and other instructions). Cloud-based storage, described in relation to FIG. 3, may be used to supplement storage 308 or instead of storage 308.

Control circuitry 304 may include VR generating circuitry, one or more MPEG decoders or other digital decoding circuitry, or any other suitable video circuits or combinations of such circuits. Video encoding circuitry may also be provided. Control circuitry 304 may also include scaler circuitry for upconverting and downconverting content into the preferred output format of user equipment 300, 301. Control circuitry 304 may also include digital-to-analog converter circuitry and analog-to-digital converter circuitry for converting between digital and analog signals. Control circuitry 304 may also be used to receive VR data for creating an optimized virtual reality store. The circuitry described herein, including for example, the VR generating, encoding, decoding, encrypting, decrypting, and scaler circuitry, may be implemented using software running on one or more general purpose or specialized processors. If storage 308 is provide as a separate device from user equipment device 300, 301, the circuitry may be associated with storage 308.

Control circuitry 304 may receive instruction from a user by way of user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user equipment device 300, 301. For example, display 312 may be a touchscreen or touch-sensitive display. In such circumstances, user input interface 310 may be integrated with or combined with display 312. In some embodiments, user input interface 310 includes a remote-control device having one or more microphones, buttons, keypads, any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to user equipment 300, 301.

Camera 318 may be any suitable video camera integrated with the equipment or externally connected. In some embodiments, camera 318 comprises a camera array. Camera 318 may be a digital camera comprising a charge-coupled device (CCD) and/or a complementary metal-oxide semiconductor (CMOS) image sensor. Camera 318 may be an analog camera that converts to digital images via a video card. In some circumstances, such as where camera 318 is integrated with or otherwise coupled with an XR device (e.g., user equipment 301, such as a VR headset or AR glasses), camera 318 can be an outward facing (or back-facing) camera and/or inward facing (or front-facing) camera. For example, an inward facing camera in a VR headset may be used to capture the gaze of a user. For example, an outward facing camera in a VR headset may be used to capture user's. body movements (e.g., reaching out to a product as displayed on display 312 in an optimized virtual store). In another example, an outward facing camera in AR glasses may be used to capture a real-world environment of a real-world store. In another example, camera 318 comprises a plurality of cameras communicatively connected to user equipment 300, 301, that are directed at outside physical environment (e.g., pointed outward to capture parallax views of the physical environment).

Sensors 320 may comprise various sensors such as gyroscopes, accelerometers, magnetometers, and the like. In conjunction or alternatively, sensors 320 may comprise biometric sensors (e.g., heartrate, blood pressure, fingerprint, etc.). For example, sensors 320 may comprise sensors to measure eye rotation (e.g., electrodes to measure eye muscle contractions). XR device 301 may also be integrated with sensors 320 comprising range imaging technologies (e.g., LASER or LIDAR) for computing distance of devices by bouncing the light of the objects and measuring delay in return (e.g., using camera 318).

Display 312 may be one or more of an XR display (e.g., VR headset display, AR glasses display, etc.), monitor, a television, a liquid crystal display (LCD) for a mobile device, amorphous silicon display, low-temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. In some embodiments, display 312 of XR device 301 comprises a left display, a right display, or both, for generating VST images, or see-through VR images. In some embodiments, user input interface 310 and/or display 312 may be integrated with or combined with circuitry for providing haptic feedback or other suitable forms of sensory output. In some embodiments, audio output equipment 314 is integrated with or combined with display 312.

Audio output equipment 314 may be provided as integrated with other elements of each one of device 300, 301 or may be stand-alone units. An audio component of videos and other content displayed on display 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304.

The XR application may be implemented using any suitable architecture. For example, it may be a stand-alone application wholly-implemented on each one of user equipment device 300, 301. In such an approach, instructions of the application may be stored locally (e.g., in storage 308), and data for use by the application is downloaded on a periodic basis (e.g., from the edge service network, from an out-of-band feed, from an Internet resource, or using another suitable approach). Control circuitry 304 may retrieve instructions of the application from storage 308 and process the instructions to provide VR generation functionality and perform any of the actions discussed herein. Based on the processed instructions, control circuitry 304 may determine what action to perform when input is received from user input interface 310. For example, such input may comprise head movement or movement of a hand or handheld device via user input interface 310. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application may be downloaded and interpreted or otherwise run by an interpreter or virtual machine (run by control circuitry 304). In some embodiments, the XR application may be encoded in the ETV Binary Interchange Format (EBIF), received by control circuitry 304 as part of a suitable feed, and interpreted by a user agent running on control circuitry 304. For example, the XR application may be an EBIF application. In some embodiments, the VR application may be defined by a series of JAVA-based files that are received and run by a local virtual machine or other suitable middleware executed by control circuitry 304. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 802.11ax, etc.), or other short-range communication via wired or wireless paths. The user equipment devices may also communicate with each other directly through an indirect path via communication network.

While sometimes described as an "XR" network or system by way of example, it will be understood that implementations that include SLAM (Simultaneous Location And Mapping) technology, are also contemplated. SLAM technology allows a variety of devices, including XR equipment, HMDs, wearable devices, industrial robots, autonomous household devices, drones, self-driving vehicles, etc., to create a map of its surroundings and to locate and assist in autonomous and/or user-assisted navigation based on the map in real time. Example XR devices include VR devices, AR devices, MR devices. The field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). For example, in an embodiment, the system may provide virtual boundaries of the safe area, and possibly other virtual elements of a scene for display, while the actual or real-world environment may also be displayed or be visible. In addition, equipment sold for or typically usable for MR or AR may be compatible with a system as herein discussed by displaying virtual elements of a scene, such as virtual boundaries. A map of an area may be generated based on sensor data captured by sensors onboard the SLAM-enabled device, and the location of the SLAM-enabled device on the map may be determined based on data generated by the device. One or more sensors may be positioned in, on, or at the SLAM-enabled device, or may be positioned elsewhere and capture a field of view of the SLAM-enabled device. For example, one or more stationary cameras in the vicinity of the SLAM-enabled device may provide image data, in addition to or instead of, cameras onboard the SLAM-enabled device. The device's sensors, such as one or more charge coupled devices and/or cameras and/or RADAR/LIDAR and the like, or a combination of the foregoing, collect visual data from the physical world in terms of reference points. In addition, or instead, a SLAM-enabled device may also use one or more of GPS data, satellite data, wireless network and/or Wi-Fi signal strength detection, acoustic signals, or any suitable visual positioning system (VPS) methods, e.g., using other previously scanned objects as anchors, or using any other suitable technique, or any combination thereof for determining location, movement and/or orientation. For example, a Wi-Fi positioning system (WPS or WiPS) may use Wi-Fi hotspots or other wireless access points to locate a device. An SSID (Service Set Identifier) and MAC (Media Access Control) address assigned to a NIC (Network Access Controller) may be used as parameters for locating the device in a WPS. A SLAM-enabled device may be equipped with IMU (inertial measurement unit). IMU data may be used for location/orientation/movement determination.

In FIG. 4, in the example system 400 for creating and providing an optimized virtual store, user equipment devices 408, 410 (e.g., which may correspond to one or more of XR device 210, user equipment 300, 301) may be coupled to communication network 406. Communication network 406 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 802.11ax, etc.), or other short-range communication via wired or wireless paths. The user equipment devices 408, 410 may also communicate with each other directly through an indirect path via communication network 406.

System 400 may comprise one or more servers such as virtual reality store server 402 (e.g., which may correspond to virtual reality store server 240) and/or optimized virtual store server 404 (e.g., which may correspond to optimized virtual store server 220), and/or one or more edge computing devices 416 (e.g., included as part of an edge computing system, such as, for example, managed by optimized virtual store server 404). In some embodiments, the XR application may be executed at one or more of control circuitry 411 of optimized virtual store server 404 or control circuitry 431 of virtual reality store server 402 (and/or control circuitry of user equipment devices 408, 410 and/or control circuitry 418 of edge computing device 416). In some embodiments, data structures, such as data associated with products and/or product uses, may be stored at database 405 maintained at or otherwise associated with optimized virtual store server 404, and/or at storage 422 and/or at storage of one or more of user equipment devices 408, 410.

In some embodiments, virtual reality store server 402 may include control circuitry 431 and storage 434 (e.g., RAM, ROM, Hard Disk, Removable Disk, etc.). In some embodiments, optimized virtual store server 404 may include control circuitry 411 and storage 414. Storage 434, 414 may store one or more databases. Servers 402, 404 may also include an input/output path 432, 412, respectively. I/O path 432, 412 may provide XR generation data, device information, or other data, over a local area network (LAN) or wide area network (WAN), and/or other content and data to control circuitry 431, 411, respectively, which may include processing circuitry, and storage 434, 414, respectively. Control circuitry 431, 411 may be used to send and receive commands, requests, and other suitable data using I/O path 432, 412, respectively, which may comprise I/O circuitry. I/O path 432, 412 may connect control circuitry 431, 411, respectively (and specifically control circuitry), to one or more communications paths.

Control circuitry 431, 411 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 431, 411 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 431, 411 executes instructions for an emulation system application stored in memory (e.g., the storage 434, 414, respectively). Memory may be an electronic storage device provided as storage 434, 414 that is part of control circuitry 431, 411, respectively.

Edge computing device 416 may comprise control circuitry 418, I/O path 420 and storage 422, which may be implemented in a similar manner as control circuitry 431, 411, I/O path 432, 412 and storage 434, 414, respectively, of virtual reality store server 402 and/or optimized virtual store server 404. Edge computing device 416 may be configured to be in communication with one or more of user equipment devices 408, 410 and also with virtual reality store server 402 and/or optimized virtual store server 404 over communication network 406, and may be configured to perform processing tasks (e.g., XR generation) in connection with ongoing processing of video data. In some embodiments, a plurality of edge computing devices 416 may be strategically located at various geographic locations, and may be mobile edge computing devices configured to provide processing support for mobile devices at various geographical regions.

Figure 5:
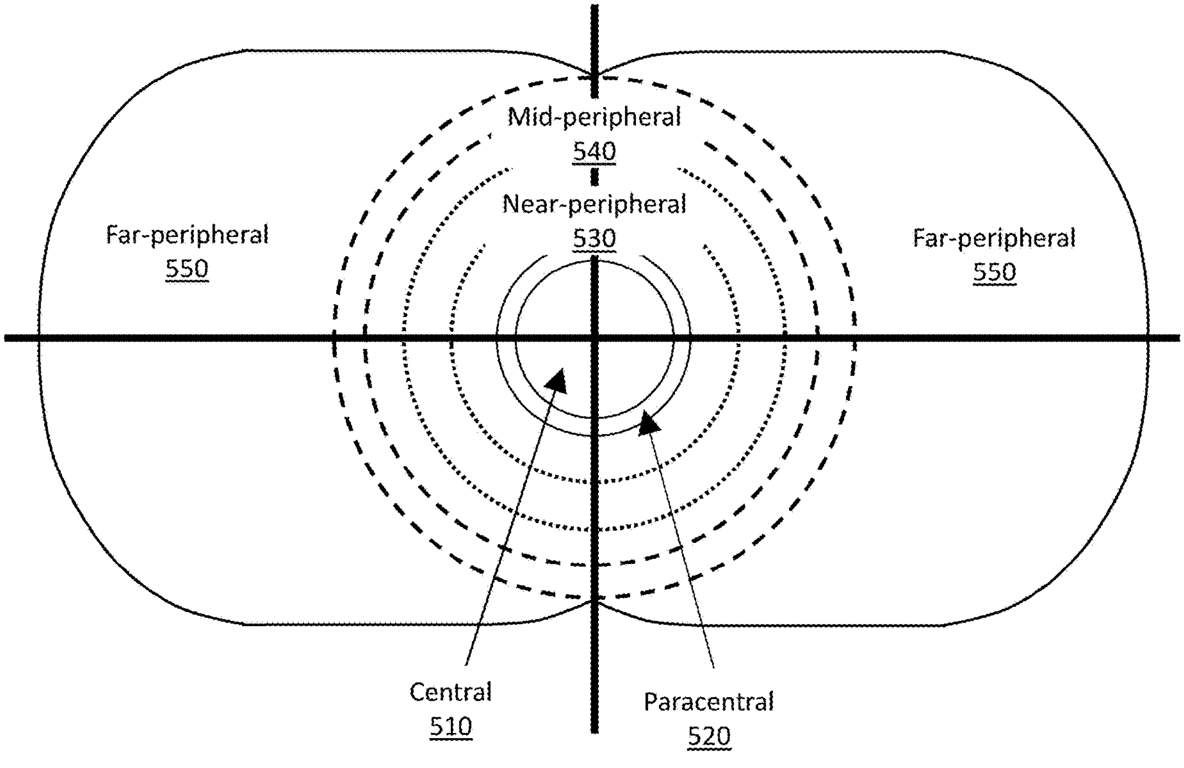
FIG. 5 depicts an example human view field, in accordance with some embodiments of the disclosure.

FIG. 5 depicts an example human view field 500, in accordance with some embodiments of the disclosure. In the example, the human view field 500 comprises central region 510, paracentral region 520, near-peripheral region 330, mid-peripheral region 340, and far-peripheral regions 350. Natural human vision allows a user to see all of the regions with varying degrees of clarity. Most of the focus lies in the central region 510. The focus naturally reduces going outward from the central region 510 and toward the near-peripheral 530 and far-peripheral 550 regions.

In some embodiments, the optimized layout for the optimized virtual store may be based on natural human focus behaviors. For example, the product of interest may be displayed in central region 510. Meanwhile, recommended associated products are displayed, based on status, in regions moving outward from the central region 510. For instance, required associated products are positioned closer to the product of interest (e.g., in the near-peripheral 530 region), while optional associated products are placed farther outward in the mid-peripheral 540 and far-peripheral 550 regions.

Figure 6:
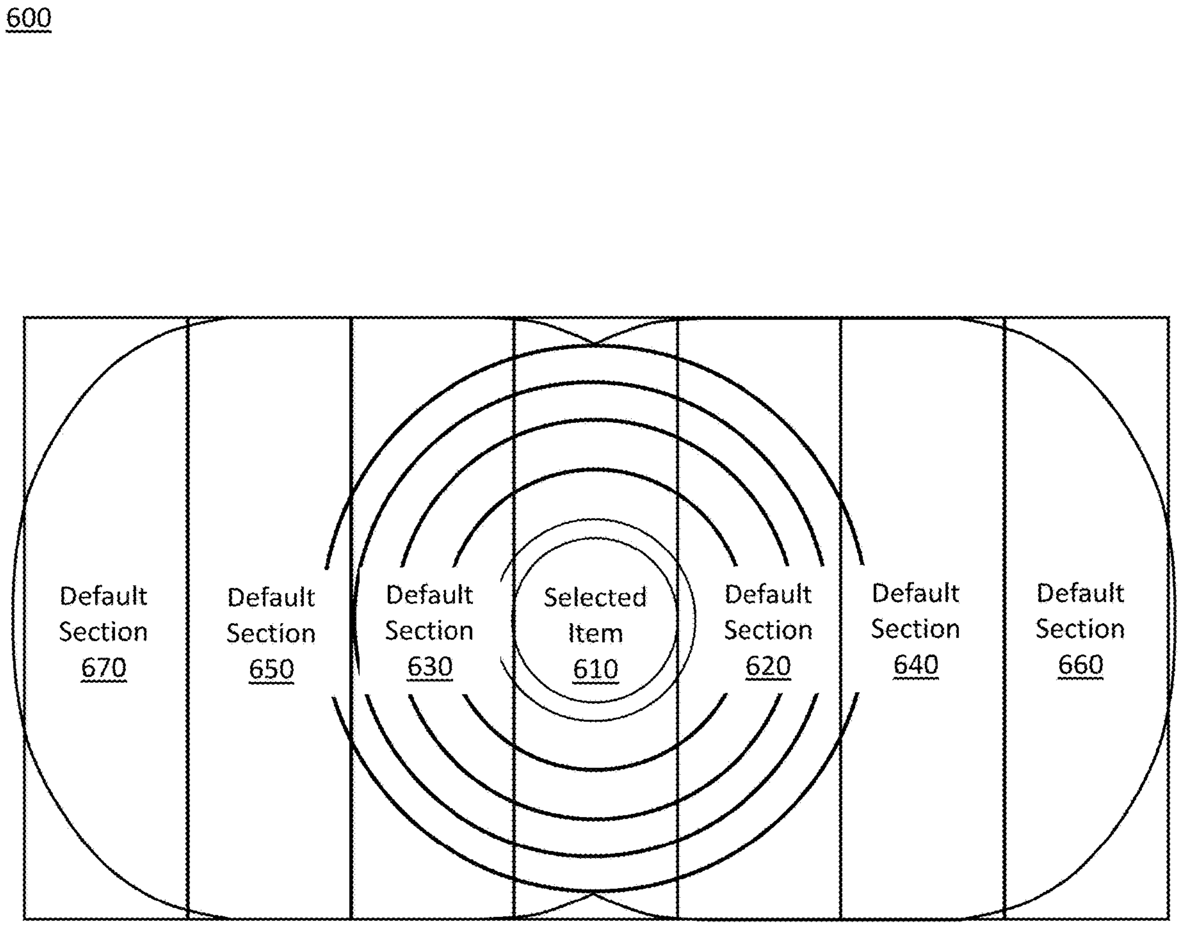
FIG. 6 depicts an example optimized virtual store layout, in accordance with some embodiments of the disclosure.

FIG. 6 depicts an example optimized virtual store layout 600, in accordance with some embodiments of the disclosure. In an embodiment, optimized virtual store layout 600 comprises dividing the view field into selected item section 610 and default virtual sections 620, 630, 640, 650, 660, and 670. In the example, the sections comprise a single row of columns along the view field. In other embodiments, sections can be configured in other layouts, such as grids, rows, encircling sections, clusters, etc. Within each section (also referred to as layout section), a product may be displayed. In another embodiment, the product and its alternatives may be displayed within the same section. For instance, a bathroom vanity is displayed in selected item section 610, while multiple brands of supply pipelines available from the virtual store are all displayed in section 630. In some embodiments, the configuration of the sections in the optimized virtual store layout is pre-defined by the virtual store or by the optimized virtual store server 240, based on user preferences or preferences of a plurality of users, etc.

In an embodiment, the sections are associated with different levels of importance (e.g., section importance levels or position importance levels), based on their presentation and/or placement, or how they are configured otherwise, relative to other sections in the optimized layout. The section importance level of each section may comprise a value (e.g., a numeric score or distance from a specific position in the optimized layout or view field, percentage of view field space occupied by the section, etc.), a qualitative status (e.g., most important, least important; largest sized section, smallest sized section, etc.), or another suitable measure.

In the example, the importance of the column sections corresponds with the level of focus (or degree of clarity of visual acuity) corresponding to their placement along a human view field. Thus, sections positioned closer to the center of the view field (e.g., central region 510) are associated with the highest level of importance, and the importance level decreases as the sections are positioned further outward toward the periphery and away from the center (e.g., toward far-peripheral regions 550). For instance, selected item section 610 has the highest level of importance because it is centrally located in the view field (e.g., corresponding to the central region 510 of the human view field, and is thus associated with the highest level of natural human visual focus). Moving downward in importance, sections 620 and 630 correspond with the near-peripheral 530 and mid-peripheral 540 regions, which are associated with mid-level focus. The outermost sections (e.g., sections 660 and 670) are in the far-peripheral regions 550 and closest to the view boundaries, and thus have the lowest level of importance.

In another example, the optimized layout may be configured such that the leftmost column section has the highest importance level, and the importance level of each section decreases the farther away it is from the leftmost section (e.g. moving toward the right-side edge of the view field).

In yet another example, the level of importance of a section is proportional to its presentation in the optimized layout. For example, the optimized layout may comprise a grid of sections, where different sections have different prominence levels (e.g., different sizes). The size of the section may be proportional to its level of importance (e.g., a larger section has higher importance while a smaller section has lower importance). In another example, different sections (and/or the products displayed therein) are presented with different degrees of luminosity or other features. The more luminous sections may have a higher level of importance, while the less luminous sections have a lower level of importance.

In an embodiment, multiple sections can share the same level of importance. In the example, sections 660 and 670 are equally the furthest away from the central region of the view field. Thus, sections 660 and 670 will both have the lowest level of importance.

Each product may be displayed in a section having an importance level that corresponds with (or is within a range of importance levels that corresponds with) the importance level of the product. In an embodiment, the importance level of a product comprises (or is based on) the status of the product (e.g., product of interest (e.g., selected), required, or optional). In conjunction or alternatively, the importance level of the product is based on the level of difficulty in finding the product in the virtual store from the user's current location (e.g., composite score, discussed in further detail in FIG. 7A).

In the embodiment, the placement of products for display on the view field may be based on correlating the importance of the product (e.g., its status with respect to the product use) with the importance of the section. For example, the product of interest (e.g., the product selected by the user and which is used to identify the product use, such as the bathroom vanity for a vanity renovation project) may be displayed in the section of the highest importance (e.g., selected item section 410). Recommended associated products that are required (e.g., essential for accomplishing the product use, such as faucets for completing a vanity renovation project) may be displayed in the sections with the next highest level of importance (e.g., sections 420, 430). Recommended associated products that are optional (e.g., can contribute, but is not necessary, to accomplishing the product use, such as putty, which is convenient but beyond necessary for sealing or connecting parts of the bathroom vanity in a vanity renovation project) may be displayed in sections further out on the view field, which have lower levels of importance (e.g., sections 640, 650, 660, and 670). In another embodiment, the recommended associated products may be further ranked amongst each other according to their composite score (e.g., a score based on their location relative to the user's location in the virtual store and/or the frequency the product appears in the virtual store, discussed in further detail in FIG. 7A). Therefore, the sections in which the recommended products are displayed can depend on the respective rank of each product.

In an embodiment, user interaction with the products displayed in the optimized virtual store layout 600 automatically causes a different set of products to be displayed (e.g., products displayed in the sections are replaced with other products), such that the selected product and/or other recommended products are displayed in placements on the view field that are more likely to attract the user's attention or visual focus. For example, if the user selects a recommended item (such as pipe wrenches displayed in section 620), the selected item may move to a section of higher importance (e.g., pipe wrenches are re-displayed in the central region, e.g., section 610) and is replaced by another recommended product (e.g., putty is now displayed in section 620). In another embodiment, user interaction with products may also automatically modify the optimized virtual store layout. For example, upon the user selecting the recommended item (e.g., a pipe wrench), a second layout (for instance, a grid layout displaying the pipe wrench and its alternatives) is generated and replaces the first layout (e.g., a series of columns).

In some embodiments, the user can toggle between the layouts. For example a graphical control may be displayed on the view field that allows the user to manually toggle between the optimized virtual store layout and the default view of the virtual reality store. In another example, navigation graphical controls (e.g., previous view, next view, etc.) may be displayed to allow the user to move through different views or different displays of product recommendations.

Figures 7A, 7B:
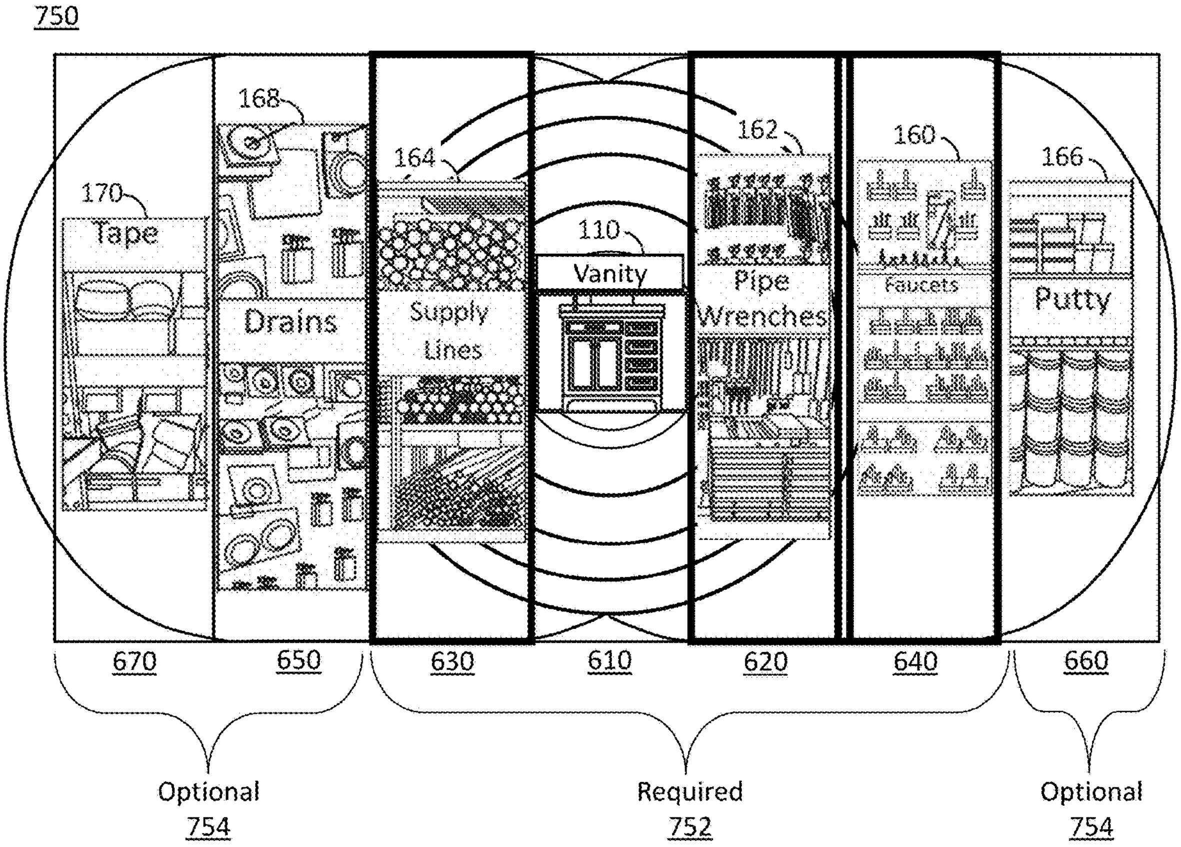
FIG. 7A depicts an example process for calculating a composite score for recommended products for determining an optimized store layout, in accordance with some embodiments of the disclosure.
FIG. 7B depicts an example optimized store layout based on composite scoring of recommended products, in accordance with some embodiments of the disclosure.

FIG. 7A depicts an example process 700 for calculating a composite score for recommended products for determining an optimized store layout, in accordance with some embodiments of the disclosure. The process 700 may be implemented, in whole or in part, by the system 400 shown in FIG. 4. One or more actions of the process 700 may be incorporated into or combined with one or more actions of any other process or embodiments described herein. The process 700 may be saved to a memory or storage (such as any one or more of those shown in FIG. 4) as one or more instructions or routines that may be executed by a corresponding device (e.g., such as user equipment 300 and/or 301 as shown in FIG. 3 and/or user equipment 408 and/or 410 as shown in FIG. 4) or system to implement the process 700. Depending on the embodiment, one or more steps of the described process may be implemented or facilitated by a server (e.g., a server in communication with one XR device 210, such as virtual reality store server 402 and/or optimized virtual store server 404 as shown in FIG. 4).

In an embodiment, whether to recommend an associated product and/or where (or how) to display it on the view field may be determined based on a composite score assigned to the location corresponding to the product in the virtual store. The composite score measures how difficult or easy it is to find the product (e.g., the amount of difficulty or ease to navigate to the location of the product) in the virtual store from user's current position in the store. The composite score may be calculated based on any one or more of: a distance score ("d-score") (e.g., the relative location of the associated product in the virtual store with respect to the location of the selected product (e.g., where the user is currently positioned in the virtual store)); a frequency score ("f-score") (e.g., the number of alternatives available in the virtual store for the associated product in a given location in the virtual store); or a rarity score ("r-score", also referred to as a reciprocal score) (e.g., how densely packed a location, such as an aisle section in the virtual store is with the associated product). Therefore, a product with a higher composite score indicates that the product is harder to find in the virtual store with respect to the user's current location. In some embodiments, the composite scores of the associated products are ranked, such that the associated products with higher composite scores may be recommended (e.g., displayed) in sections of higher importance in the view field of the optimized virtual store (discussed in further detail in FIG. 7B). Meanwhile, associated products with lower composite scores may be easier to find in the virtual store and are thus displayed in sections of lower importance in the view field of the optimized virtual store.

In an embodiment, the virtual store location of the associated product is identified. The virtual store location corresponding to the associated product can comprise an aisle or aisle section (e.g., a column, a shelf or set of shelves, a portion of a shelf, etc.), a rack, bin, display case or display case section, wall or wall section, and the like. For example, the system identifies the aisle section(s) of the virtual store in which the associated product occurs. The system calculates the navigating distance from the user's current location in the virtual store to the location of the associated product. A distance score ("d-score") is assigned to the location of the associated product. The d-score is proportional to the distance between the location of the associated product and the location of the user. An associated product located farther from the user has a higher d-score and is likely more difficult for the user to find from navigating the virtual store. Thus, in an optimized virtual store, an associated product with a higher d-score is more likely to be recommended and displayed within the view field.

In an embodiment, the number of alternatives of the associated product available in the location (of the associated product) is determined. An alternative product may be one that is suitable for replacing the associated product in accomplishing the product use. For example, alternative products can comprise products of different brands, models, versions of the same associated product. In another example, alternative products can comprise similar products which serve the same role as the associated product with respect to the product use. A frequency score ("f-score") is assigned to the location of the associate product. The f-score indicates the number of product alternatives relative to the total number of offerings in the location. For example, an aisle section may offer 30 different items, wherein 10 of them are faucet alternatives (e.g., chrome faucets, brass faucets, double handle faucets, touch-activated faucets, waterfall taps, or other faucet brands, styles, models, etc.). An f-score is assigned to the that aisle section, where the f-score is the number of faucet alternatives (e.g., 10) relative to the total number of offerings (e.g., 30). In some embodiments, when the associated product is located in multiple locations of the virtual store, the location with the highest f-score is selected (e.g., as the designated location for the product). For example, if putty is located at the point of purchase displays of multiple check-out aisles throughout the virtual store, the location of putty which has the highest f-score (e.g., has the highest number of putty alternatives to the total items in the location) is determined to be the designated location and will be used for calculating the composite score.

Once the f-score is calculated, the rarity score (e.g., r-score) of the location (or designated location) of the associated product is calculated. In an embodiment, the r-score is the reciprocal of the f-score corresponding to the location of the associated product. The higher the r-score of the location of an associated product, the less "densely packed" the location is with that product, and thus the more difficult it would be to find that associated product at the location. For example, pipe wrenches may be tucked in a small part of an aisle section having a large number of other offerings, such that a shopper can easily overlook the pipe wrenches when browsing that aisle section. The pipe wrenches would have a low f-score and accordingly a high r-score.

In an embodiment, the composite score of the location of the product is based on the d-score and the r-score. For example, the d-score may be multiplied by the r-score, resulting in the composite score for the location of the product. The higher the composite score, the more difficult it may be for a user to find the product in the virtual store from his current location, and the more beneficial it would be to the user (e.g., in accomplishing the product use) to recommend and display the product in a section of higher importance in the view field. For example, the faucet 160, pipe wrench 162, and supply line 164 are the required objects. Suppose that of the three, the faucets section is closest to the user's current location in the virtual store (e.g., low d-score) and has a high frequency of faucet alternatives with respect to the total number of products in the aisle section (e.g., high f-score, resulting in a low r-score). Thus, the location of the faucets has a low composite score and the faucets are easier to find in the virtual store from the user's current location. Meanwhile, the pipe wrench section is the farthest of the three required products from the user's location (e.g., high d-score) and has very few pipe wrenches amongst a large variety of other tools (e.g., low f-score, resulting in high r-score). Thus, the location of the pipe wrenches has a high composite score and are more difficult to find in the virtual store from the user's current location.

When a location (e.g., aisle section) in the virtual store carries more than one required product for the product use, it may be beneficial to the user (e.g., to increase efficiency in shopping for required products to accomplish the product use) to recommend and display the contents of that aisle section in the optimized virtual store layout. Accordingly, in some embodiments, the composite score (e.g., d-score multiplied by r-score) for each required product (e.g., sharing the same location) is calculated, and the composite score for each required product is updated comprising the sum of the composite scores (e.g., a cumulative composite score) for all of the required products in that same location. For example, suppose pipe wrenches and faucets (both required products) share the same aisle section. Respective composite scores are calculated for the aisle section of the pipe wrenches and for the aisle section of the faucets. A cumulative composite score is calculated by summing the respective composite scores for the pipe wrenches and for the faucets. The composite scores for both the aisle section of the pipe wrenches and the aisle section of the faucets are updated with the value of the cumulative composite score. Thus, this may result in the aisle sections for pipe wrenches and for faucets ultimately having a composite score that is high and/or the same as each other.

In another embodiment, when a location in the virtual store carries both required products and optional products, the cumulative composite score is calculated as the sum of the respective composite scores of each required product and a fraction (e.g., 50%, etc.) of the sum of the respective optional products.

FIG. 7B depicts an example optimized virtual store layout 750 based on composite scoring of recommended products, in accordance with some embodiments of the disclosure. In an embodiment, the optimized virtual store layout 750 is divided into sections of different importance levels that correspond to the focus level of regions in a human view field. A recommended product is displayed in the sections based on its composite score. For example, a product with a higher composite score will be displayed in a section having a higher importance level (e.g., closer to the central region 510 of the view field). A product with a lower composite score will be displayed in a section having a lower importance level (e.g., farther from the central region, such as the far-peripheral region 550).

Further in the embodiment, a group 752 of sections is reserved for displaying required products (e.g., required sections 610, 620, 630, 640) and correspond with human view field regions of higher focus (e.g., the required sections span the central 510, paracentral 520, near-peripheral 530, and mid-peripheral 540 regions). Meanwhile, another group 754 of sections is reserved for displaying optional products (e.g., optional sections 650, 660, and 670) and correspond with human view field regions of lower focus (e.g., the optional sections span the far-peripheral region 550). In other embodiments, other suitable arrangements of status-based groups of sections may be used. For instance, all sections to the right of the central region 510 may be reserved for required products while all sections to the left of the central region 510 may be reserved for optional products.

In conjunction or alternatively, where multiple sections are reserved for products of the same status (e.g., group 754 is reserved for displaying optional products), some or each of those sections may have different levels of importance based on their placement in the optimized layout and/or whether they are reserved for products of a certain status. For example, while sections 650, 660, and 670 are reserved for displaying optional products, sections 660 and 670 may share the same level of importance (e.g., the lowest level of importance) because they are equally the furthest away from the central region in the view field. Meanwhile, section 650 is closer to the central region than sections 660 and 670 and therefore has a higher level of importance than sections 660 and 670. Further, although section 650 equally far away from the central region as is section 640, because section 640 is associated with a required status, section 650 may have a lower level of importance than section 640.

To determine where to display a recommended product in the optimized virtual store layout 750, the system first identifies the products that are required (e.g., faucet 160, pipe wrench 162, supply line 164) and the products that are optional (e.g., putty 166, drains 168, and tape 170). Within each status-based set of products, the products are ranked by composite score and are placed in the appropriate status-based section according to the product's rank and the section importance level (e.g., position importance level) of the section (e.g., a product with a higher rank will be displayed in a section having a higher level of importance). In the example, faucet 160, pipe wrench 162, and supply line 164 are required products and would each be placed in one of the sections of the required group 752. Determining which of the required sections each required product would be placed in depends on their respective composite score (or their respective rank based on composite score). For instance, from highest to lowest composite score, the required products are ranked as pipe wrench 162 (composite score of 102.50), supply line 164 (composite score of 22) and faucet 160 (composite score of 6.75). Among the required sections, sections 620 and 630 share the highest level of importance, and section 640 has a lower level of importance. Therefore, pipe wrench 162 is displayed in section 620, supply line 164 is displayed in section 630, and faucet 160 is displayed in section 640. Likewise, putty 166, drains 168, and tape 170 are optional products and would each be placed in one of the sections of the optional group 754. From highest to lowest composite score, the optional products are ranked as drains 168 (composite score of 100), putty (composite score of 66.6) and tape (composite score of 19.06). Among the optional sections, section 450 has the highest level of importance and sections 660 and 670 share the lowest level of importance. Therefore, drains 168 are displayed in section 650, tape 170 is displayed in section 670, and putty 166 is displayed in section 660.

In some embodiments, the sections in the optimized virtual store layout 750 are presented dynamically. For example, to fit multiple sections within the same view field, sections may be presented in an accordion style. For instance, the outer sections (e.g., 640, 550, 560, 670) may be compressed when the user is not currently viewing them, and expanded when the user views them (e.g., directs his gaze toward the sections for a time period, or selects or inputs a command to expand them, etc.). In another example, sections may be presented via a carousel, sliding frames, nesting, and other suitable presentation modes.

In some embodiments, the display of the product in the optimized virtual store comprises a display of the product as presented in its location in the virtual store. For instance, when displaying the pipe wrenches 162 in section 620, the display includes a portion of the aisle section where the pipe wrenches are located in the virtual store and the pipe wrenches are shown "as is" in the aisle section (e.g., an image of the aisle section offering the assortment of pipe wrenches is replicated in section 620 of the optimized virtual store layout 750). In some embodiments, the optimized virtual store changes based on changes in the virtual store's inventory. For example, if an aisle section of 10 pipe wrench alternatives is shown in section 620, and one brand of pipe wrench becomes out of stock, then that pipe wrench is removed from the optimized virtual store (and the 9 remaining pipe wrench alternatives will be displayed).

In some embodiments, the optimized virtual store layout 750 changes dynamically and automatically with user interaction. For example, a user may interact with the optimized virtual store by selecting a displayed product (e.g., by way of user motions or gestures, speech commands or queries, controller commands, or other suitable user input), adding a displayed product to a shopping cart, showing interest in a displayed product (e.g., by way of user gaze on the product, speech commands or queries, controller commands, or other suitable user input), deselecting a displayed product (e.g., undoing a selection of a product or dismissing a product alternative that the user is not interested in), and the like. Based on the user interaction, a corresponding change in the optimized virtual store can be made, such as changing the layout of the sections (e.g., displaying different sections through different transition modes such as accordion, carousel, nested sections, cascading frames, sliding frames, rotating the view field, or other suitable display transition techniques). In conjunction or alternatively, the products displayed in the sections can be changed, replaced, moved, shifted, removed, and so forth, when a product is selected (or when the user demonstrates interest in or deselects the product).

In some embodiments, the selected product remains displayed in the central region of the view field (or other suitable region corresponding to a high importance level or high level of focus). In other embodiments, the section of the selected product reduces in size and/or the selected product is moved to a region of lower focus (for instance, move from central region 510 to near-peripheral 530 or mid-peripheral regions 540), while other products to be recommended to the user are brought to the user's attention by being moved to the selected product's previous region. In some embodiments, a section of the optimized virtual store layout 750 is dedicated for displaying a history of previously selected products. In some embodiments, the optimized virtual store includes graphical controls or is configured to receive user input that allows the user to manually modify the optimized virtual store (e.g., rearrange the display of products), toggle between the default view of the virtual store and the optimized virtual store view, navigate between previous and next views, view transaction status (e.g., view shopping cart, recent orders, etc.) associated with the products, and so forth. In some embodiments, the optimized virtual store layout 750 is saved such that the user can retain the state of the optimized virtual store between sessions.

Figure 8:
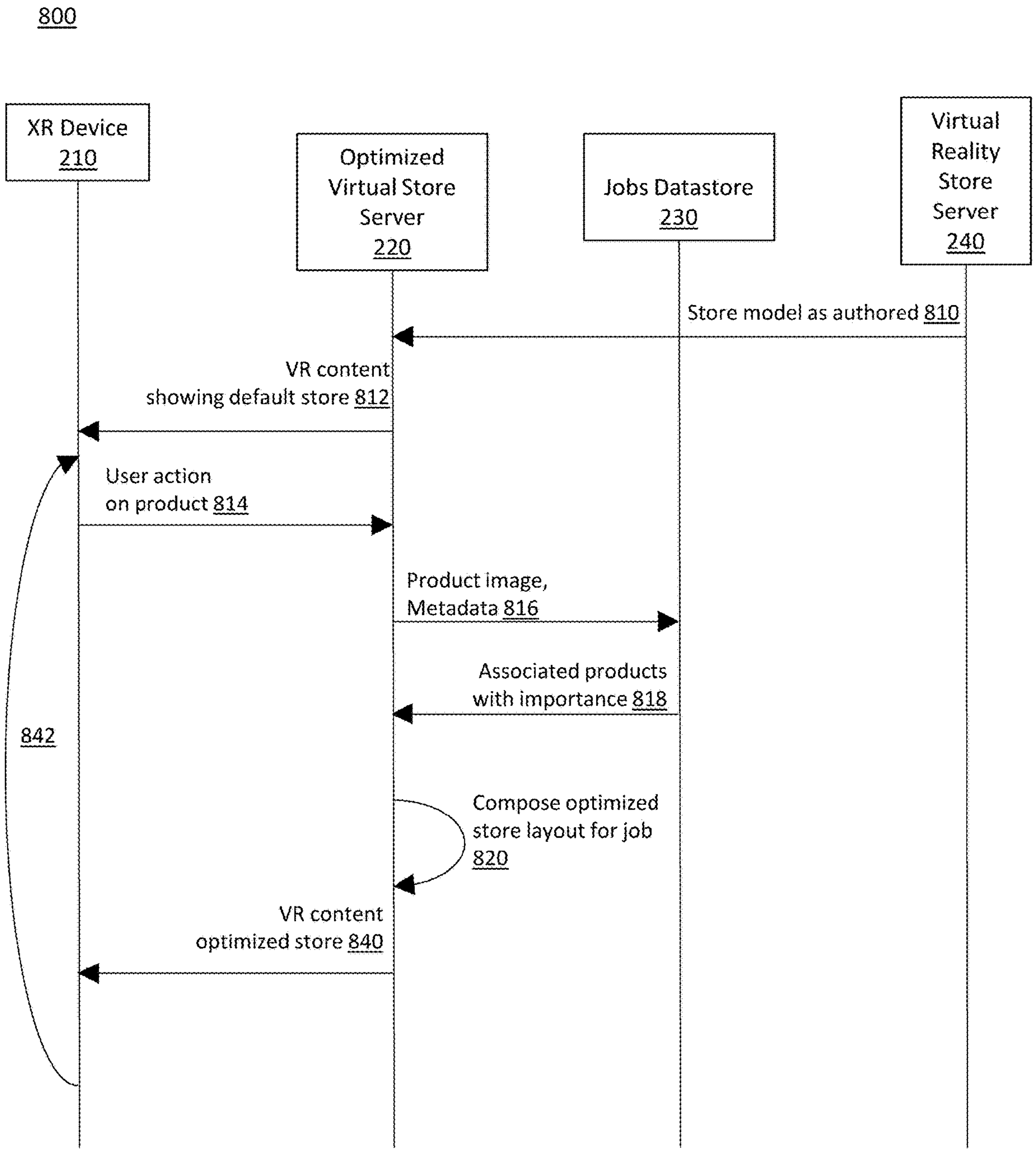
FIG. 8 depicts an example system sequence diagram of providing product recommendations in an optimized virtual store, in accordance with some embodiments of the disclosure.

FIG. 8 depicts an example system sequence diagram 800 of providing product recommendations in an optimized virtual store, in accordance with some embodiments of the disclosure. The sequence 800 may be implemented, in whole or in part, by the system 400 shown in FIG. 4. One or more actions of the sequence 800 may be incorporated into or combined with one or more actions of any other process or embodiments described herein. The sequence 800 may be saved to a memory or storage (such as any one or more of those shown in FIG. 4) as one or more instructions or routines that may be executed by a corresponding device (e.g., such as user equipment 300 and/or 301 as shown in FIG. 3 and/or user equipment 408 and/or 410 as shown in FIG. 4) or system to implement the sequence 800. Depending on the embodiment, one or more steps of the described process may be implemented or facilitated by a server (e.g., a server in communication with one XR device 210, such as virtual reality store server 402 and/or optimized virtual store server 404 as shown in FIG. 4).

In an embodiment, the system comprises XR device 210, optimized virtual store server 220, jobs datastore 230, and virtual reality store server 240. At step 810, virtual reality store server 240 provides a virtual model of a store (e.g., a virtual reality store) to optimized virtual store server 220. Virtual reality store server 240 may be associated with an e-commerce vendor. The virtual reality store may be authored by the e-commerce vendor. The virtual store may mirror the layout and inventory of a real-world store. The virtual store may be updated in real-time to reflect the current inventory of the real-world store. In another embodiment, the virtual store reflects the current collective inventory of multiple locations or branches of the e-commerce vendor. In yet another embodiment, the e-commerce vendor is an e-commerce aggregator and the virtual store combines the virtual models of multiple stores of different vendors.

At step 812, optimized virtual store server 220 provides a default view of the virtual store to XR device 210. In an embodiment, the default view of the virtual store comprises an unmodified view of the virtual store as originally provided by the virtual reality store server 240 (e.g., as originally authored by the e-commerce vendor).

At step 814, the user selects a first product from the virtual store (e.g., product of interest). The product of interest may be selected based on a user action or input detected by XR device 210. In another embodiment, the product of interest is selected when the user demonstrates interest in the product (e.g., gazes at the product of interest for a time period, etc.).

At step 816, the user selection is sent to optimized virtual store server 220, which identifies the selected product of interest (e.g., based on the product image, product name, product serial number, or other metadata associated with the product). Based on the metadata associated with the product of interest, optimized virtual store server 220 queries jobs datastore 230 for a product use corresponding to the product of interest. In another embodiment, the product use is further determined based on user data, other data associated with the product of interest, industry data, etc.

At step 818, based on the product use, associated products are identified (e.g., stored as metadata associated with the product use). The associated products can have various statuses (e.g., required or optional) with respect to accomplishing the product use.

At step 820, optimized virtual store server 220 determines which associated product(s) to recommend to the user based on various factors, such as the status of the associated product, metadata associated with the product use, metadata associated with the product of interest, user data, composite score (e.g., measuring the degree of difficulty in finding the product in the virtual store from the user's current location in the virtual store), and so forth. Based on the determination, optimized virtual store server 220 generates an optimized virtual store layout. The associated products are recommended by way of being displayed in the optimized virtual store.

At step 840, optimized virtual store server 220 provides the optimized virtual store to VR device 210.

At step 842, the process is iterated with each user interaction with the optimized virtual store.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating for display, according to a field of view, a virtual reality (VR) shopping interface based on a layout for a plurality of products, wherein:

the generating for display the VR shopping interface based on the layout comprises, in a first state, representing the plurality of products in a virtual store, wherein the layout is based on a pre-established, originally authored VR model, and wherein the layout indicates a different position with respect to the field of view for each of the plurality of products according to which the plurality of products are to be displayed;

determining a product of interest from the plurality of products, the layout indicating a position with respect to the field of view for the product of interest, wherein the product of interest is located at a first virtual location with respect to the virtual store;

based at least in part on the determined product of interest, identifying a product use, wherein the product use comprises an activity to be performed by way of the product of interest;

identifying a recommended product from the plurality of products based on the product use comprising the activity to be performed by way of the product of interest, the layout indicating a first position with respect to the field of view for the recommended product, wherein the recommended product is located at a second virtual location with respect to the virtual store;

comparing a first relationship between the product of interest and the product use with a second relationship between the recommended product and the product use; and based at least in part on the identifying the recommended product based on the product use comprising the activity to be performed by way of the product of interest:

generating, based at least in part on the pre-established, originally authored VR model, an optimized layout to indicate a second position with respect to the field of view for the recommended product, wherein the position and the second position in the optimized layout are determined based at least in part on the compared first and second relationships; and generating for display the VR shopping interface based on the optimized layout, wherein:

the generating for display the VR shopping interface based on the optimized layout comprises, in a second state, representing simultaneously both the product of interest at the position with respect to the field of view for the product of interest and the recommended product at the second position with respect to the field of view for the recommended product, and wherein the pre-established, originally authored VR model remains unmodified between the generating for display the VR shopping interface in the first state and the generating for display the VR shopping interface in the second state.

2. The method of claim 1, wherein the product use associated with the product of interest is identified based on at least one of metadata associated with the product of interest, metadata associated with a similar product to the product of interest, or user data.

3. The method of claim 1, wherein the recommended product supplements the product of interest in accomplishing the product use.

4. The method of claim 1:

wherein each of the plurality of products is associated with a product importance level;

wherein each position in the optimized layout is associated with a position importance level;

wherein a product importance level of the product of interest corresponds with a position importance level of the position in the optimized layout; and wherein a product importance level of the recommended product corresponds with a position importance level of the second position in the optimized layout.

5. The method of claim 4, wherein the product importance level of the recommended product is based on a status of the recommended product, the status being one of a required status or an optional status;

wherein the recommended product has a required status if the recommended product is necessary to accomplish the product use; and wherein the recommended product has an optional status if the recommended product is not necessary to accomplish the product use.

6. The method of claim 5, wherein the status of the recommended product is determined based on at least one of: (i) the product of interest, (ii) metadata associated with a similar product to the product of interest, or (iii) user data.

7. The method of claim 4, wherein the product importance level of the recommended product comprises a composite score based on a level of difficulty of finding the recommended product in the first position of the layout from the position of the product of interest in the layout.

8. The method of claim 4, wherein positions of lower position importance levels are located toward a periphery of the optimized layout and wherein positions of higher position importance levels are located toward a center of the optimized layout.

9. The method of claim 1, wherein the position and the second position are relocated in the optimized layout when the recommended product is selected.

10. The method of claim 1, wherein display attributes associated with displaying each of the product of interest and the recommended product comprise at least one of: distance between the product of interest and the recommended product, centrality of position with respect to the field of view, size of area occupied in the field of view, rendered object size, luminosity, transparency, focus, coloring, or labeling.

11. The method of claim 10, wherein the display attributes of the recommended product is based on whether the recommended product has a required status or an optional status, wherein the recommended product is required if the recommended product is necessary for accomplishing the product use, and wherein the recommended product is optional if the recommended product is not necessary for accomplishing the product use.

12. The method of claim 10, wherein the display attributes of the recommended product are based on a product importance level of the recommended product.

13. The method of claim 10, further comprising:

in response to receiving a selection of the recommended product displayed in the second position of the optimized layout:

relocating the product of interest to a third position in the optimized layout or removing the product of interest from display;

relocating the recommended product to the position in the optimized layout; and displaying a second recommended product in the second position in the optimized layout.

14. The method of claim 1, further comprising:

displaying a transaction status associated with the product of interest and the recommended product.

15. The method of claim 1, wherein the product of interest is determined based on at least one of: a user motion, a gesture, a speech command, an input received from a control device selecting the product of interest, or a user gaze on the product of interest for a period of time.

16. The method of claim 1:

wherein the first state of the VR shopping interface comprises a first VR interface layer, wherein the first VR interface layer comprises the representing of, based on the layout, the plurality of products in the virtual store; and wherein the second state of the VR shopping interface comprises a second VR interface layer overlaid on the first VR interface layer, wherein the second VR interface layer comprises the representing simultaneously of, based on the optimized layout, both the product of interest at the position with respect to the field of view for the product of interest and the recommended product at the second position with respect to the field of view for the recommended product.

17. A system comprising:

control circuitry configured to:

generate for display, according to a field of view, a virtual reality (VR) shopping interface based on a layout for a plurality of products, wherein;

the generating for display the VR shopping interface based on the layout comprises, in a first state, representing the plurality of products in a virtual store, wherein the layout is based on a pre-established, originally authored VR model, and wherein the layout indicates a different position with respect to the field of view for each of the plurality of products according to which the plurality of products are to be displayed;

determine a product of interest from the plurality of products, the layout indicating a position with respect to the field of view for the product of interest, wherein the product of interest is located at a first virtual location with respect to the virtual store;

based at least in part on the determined product of interest, identify a product use, wherein the product use comprises an activity to be performed by way of the product of interest;

identify a recommended product from the plurality of products based on the product use comprising the activity to be performed by way of the product of interest, the layout indicating a first position with respect to the field of view for the recommended product, wherein the recommended product is located at a second virtual location with respect to the virtual store;

compare a first relationship between the product of interest and the product use with a second relationship between the recommended product and the product use; and based at least in part on the identifying the recommended product based on the product use comprising the activity to be performed by way of the product of interest:

generate, based at least in part on the pre-established, originally authored VR model, an optimized layout to indicate a second position with respect to the field of view for the recommended product, wherein the position and the second position in the optimized layout are determined based at least in part on the compared first and second relationships; and generate for display the VR shopping interface based on the optimized layout, wherein:

the generating for display the VR shopping interface based on the optimized layout comprises, in a second state, representing simultaneously both the product of interest at the position with respect to the field of view for the product of interest and the recommended product at the second position with respect to the field of view for the recommended product, and wherein the pre-established, originally authored VR model remains unmodified between the generating for display the VR shopping interface in the first state and the generating for display the VR shopping interface in the second state.

18. The system of claim 17, wherein the product use associated with the product of interest is identified based on at least one of metadata associated with the product of interest, metadata associated with a similar product to the product of interest, or user data; and wherein the recommended product supplements the product of interest in accomplishing the product use.

19. The system of claim 17:

wherein each of the plurality of products is associated with a product importance level;

wherein each position in the optimized layout is associated with a position importance level;

wherein a product importance level of the product of interest corresponds with a position importance level of the position in the optimized layout; and wherein a product importance level of the recommended product corresponds with a position importance level of the second position in the optimized layout.

20. A method comprising:

generating, for display within a virtual reality (VR) shopping interface in a first state, a representation of a virtual store environment based on a predefined layout corresponding to a field of view, wherein the predefined layout is based on a pre-established, originally authored VR model, and wherein the predefined layout comprises positional data with respect to the field of view for a plurality of products, wherein each product of the plurality of products is assigned a distinct virtual location within the virtual store environment;

determining a product of interest from among the plurality of products, the predefined layout indicating a position of the product of interest, wherein the position of the product of interest corresponds to a first virtual location within the virtual store environment;

identifying, based at least in part on the product of interest, a corresponding product use, the product use comprising an activity to be performed by way of the product of interest;

selecting, from the plurality of products, a recommended product based on the identified product use, wherein the recommended product is associated with facilitating or enhancing the activity to be performed by way of the product of interest, and the predefined layout indicating a first position of the recommended product, wherein the first position of the recommended product corresponds to a second virtual location within the virtual store environment;

comparing a first relationship between the product of interest and the product use with a second relationship between the recommended product and the product use;

optimizing the predefined layout by repositioning the recommended product from the first position to a second position, wherein the position and the second position in the optimized layout are determined based at least in part on the compared first and second relationships, wherein the second position is determined further based on at least one of: the field of view or the position of the product of interest, such that display of the recommended product is within a certain distance of display of the product of interest in the VR shopping interface regardless of a distance between the first virtual location and the second virtual location, and wherein the pre-established, originally authored VR model remains unmodified in the optimizing of the predefined layout; and generating, for display, the VR shopping interface in a second state based on the optimized layout, wherein:

both the product of interest at the position and the recommended product at the second position are simultaneously rendered, wherein the positional data of the product of interest and the recommended product in the optimized layout corresponds to respective levels of natural human visual focus with respect to the field of view, and wherein the pre-established, originally authored VR model remains unmodified between the generating for display the VR shopping interface in the first state and the generating for display the VR shopping interface in the second state.

* * * * *